US00H002270H

(19) United States
(12) Statutory Invention Registration
Le Saint et al.

(10) Reg. No.: US H2270 H
(43) Published: Jun. 5, 2012

(54) OPEN PROTOCOL FOR AUTHENTICATION AND KEY ESTABLISHMENT WITH PRIVACY

(75) Inventors: Eric F. Le Saint, Los Altos, CA (US); Dominique Louis Joseph Fedronic, Belmont, CA (US)

(73) Assignee: Actividentity, Inc., Fremont, CA (US)

(21) Appl. No.: 12/803,968

(22) Filed: Jul. 9, 2010

Related U.S. Application Data

(60) Provisional application No. 61/349,396, filed on May 28, 2010, provisional application No. 61/261,634, filed on Nov. 16, 2009, provisional application No. 61/256,192, filed on Oct. 29, 2009, and provisional application No. 61/224,379, filed on Jul. 9, 2009.

(51) Int. Cl.
*H04L 9/30* (2006.01)

(52) U.S. Cl. ..... 713/168

(58) Field of Classification Search ..... 713/168; 380/270

See application file for complete search history.

(56) References Cited

U.S. PATENT DOCUMENTS

| | | | | |
|---|---|---|---|---|
| 7,907,935 | B2 * | 3/2011 | Le Saint et al. | 713/152 |
| 2005/0136964 | A1 * | 6/2005 | Le Saint et al. | 713/155 |
| 2011/0252466 | A1 * | 10/2011 | Le Saint et al. | 726/9 |

* cited by examiner

*Primary Examiner*—Daniel Pihulic

(74) *Attorney, Agent, or Firm*—Muirhead and Saturnelli, LLC

(57) ABSTRACT

A suite of efficient authentication and key establishment protocols for securing contact or contactless interfaces between communicating systems. The protocols may be used in secure physical access, logical access and/or transportation applications, among other implementations. The system authenticates a mobile device such as a smart card and/or mobile phone equipped with a secure element presented to one or more host terminals and establishes shared secure messaging keys to protect communications between the device and terminal. Secure messaging provides an end-to-end protected path of digital documents or transactions through the interface. The protocols provide that the device does not reveal identification information to entities different from a trusted host. The terminal may be a contactless reader at a door for controlling physical access, a desktop, laptop or kiosk for controlling logical access, and/or an access point for obtaining an encrypted digital ticket from an authenticated mobile device used for transit applications.

40 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPEN PROTOCOL FOR AUTHENTICATION AND KEY ESTABLISHMENT WITH PRIVACY

RELATED APPLICATIONS

This application claims priority to: U.S. Provisional App. No. 61/349,396 filed May 28, 2010; U.S. Provisional App. No. 61/261,634 filed Nov. 16, 2009; U.S. Provisional App. No. 61/256,192 filed Oct. 29, 2009; and U.S. Provisional App. No. 61/224,379 filed Jul. 9, 2009, all of which are incorporated herein by reference.

TECHNICAL FIELD

This application is related to the field of secure communications and, more particularly, to cryptographic key management and the establishment of a protected communication channel between entities.

BACKGROUND OF THE INVENTION

Secure communications technology, such as GlobalPlatform secure channel, IpSec, SSL/TLs etc., is available to allow two communicating systems equipped with cryptographic modules to exchange information with confidentiality and integrity. These methods rely generally on a first shared secret key establishment step and a second key derivation step whereby session keys are derived from the shared secret.

In the case of secure contact or contactless transactions between a personal device equipped with a secure Integrated Circuit Chip (ICC), such as a smart card or a mobile phone, and an access point, such as a contactless or Near Field Communication (NFC) door reader, sensitive identification information or secrets may be exchanged. However, increased security in protecting the access and exchange of the confidential information often results in reduced performance/increased user wait times. Traditionally, for contactless solutions with rapid transactions, performance has been favored over security. Such systems offer no protection or weak protection for the credential data that is communicated. A suitable comprise between performance and security is required.

In an open domain or multi-domain environment, the communicating systems may be mutually authenticated, be equipped with totally independent PKI key pairs that are either generated at the time of the transaction or generated or imported in advance. The public keys may be certified with independent but mutually trusted authorities so the communicating systems hosting the private key can be authenticated. Using zero, one or more key pairs on each side, a shared secret establishment process first derives a shared secret from a public key infrastructure (PKI) key agreement method such as Diffie-Heilman and/or Elliptic Curve Diffle Heilman (ECDH). A key transport method, such as RSA key transport, may also be used. PKI key agreement techniques are varied and extensively described, for example, in IpSec/IKE (Internet Key Exchange), the National Institute of Standards and Technology (NIST) Special Publication 800-56A entitled "Recommendation for Pair-Wise Key Establishment Schemes Using Discrete Logarithm Cryptography" by Elaine Barker et al. (revised, March 2007), which is incorporated herein by reference, and/or NIST Special Publication 800-56B "Recommendation for Pair-Wise Key Establishment Schemes Using Integer Factorization Cryptography" by Elaine Barker et al. (August 2009), which is incorporated herein by reference. The session keys used to protect the transported data are generally derived from the resulting shared secret as a second step, which includes a key derivation and a mutual authentication step. An example of session key derivation function is provided in NIST SP 800-56A and/or NIST SP 800-108, "Recommendation for Key Derivation Using Pseudorandom Functions," which is incorporated herein by reference.

A concern of such key establishment techniques is that the time for executing the cryptography of the first key establishment step inside the ICC of a personal security device with low computing power is prohibitive. This prevents the deployment of such technology with the desired key length or security protection level. Another concern is that the key establishment step involves sending multiple requests and response pairs to the ICC. These multiple requests may add overhead and latency to the transaction, particularly with remote systems. Also with multiple requests, the ICC includes additional functionality and resources to maintain the intermediate states between requests. In addition, in many instances, it may be desirable to efficiently authenticate a user/device without identifying the user/device to an entity that is not part of the transaction.

Accordingly, it would be desirable to provide a system that facilitates the widespread and efficient use of PKI key agreement techniques, and/or other similar key establishment techniques, in a way that still provides for appropriate security, limits the number of requests and responses and including the ability to authenticate without identifying a transaction participant to non-participants.

SUMMARY OF THE INVENTION

According to the system described herein, a method for authenticating a device includes generating authentication information at a host. A request may be sent to authenticate a device to the host, wherein the request includes at least a portion of the authentication information. A response to the request may be received at the host in which the response includes encrypted information and an anonymous identifier of the device that does not provide readable identification information to an entity other than the host. The device may be authenticated using the encrypted information and the anonymous identifier. The method may receiving only one response with the encrypted information and the anonymous identifier. The anonymous identifier and/or the encrypted information may be a one-time use identifier of the device. The request sent from the host to the device may be unencrypted. A portion of the encrypted information in the response may be encrypted using a portion of the authentication information. The encrypted information sent from the device to the host may be decipherable by only the host. Each of the host and the device may use a shared secret which may be one of: established by the device before sending back the response to the request to the host and established in advance before sending authentication information from the host. A portion of the encrypted information in the response may be encrypted using a key derived from the shared secret. The method may further include retrieving stored information corresponding to the authenticating of the device that is stored on at least one of: the device and the host. The method may further include deactivating the host, wherein reactivation of the host is performed using an administrator device. The device may include at least one of: a smart card and a mobile phone having a secure element. The host may be an access point of an access controlled system and, upon presentation of the device at the access point, the access point authenticates the device and establishes a shared secret with the device to obtain an access credential, and wherein the access point relies on the access control system to validate the access credential for authorization and granting access.

According further to the system described herein, a non-transitory computer readable medium stores computer software for authenticating a device. The computer software may include executable code that generates authentication information at a host. Executable code may be provided that sends a request to authenticate a device to the host, wherein the request includes at least a portion of the authentication information. Executable code may be provided that receives a response to the request from the device, wherein the response includes encrypted information and an anonymous identifier of the device that does not provide readable identification information to an entity other than the. Executable code may be provided that authenticates the device using the encrypted information and the anonymous identifier. The anonymous identifier and/or the encrypted information may be a one-time use identifier of the device. The request sent from the host to the device may be unencrypted. A portion of the encrypted information in the response may be encrypted using a portion of the authentication information. Each of the host and the device may use a shared secret which may be one of: established by the device before sending back the response to the request to the host and established in advance before sending authentication information from the host. A portion of the encrypted information in the response may be encrypted using a key derived from the shared secret. Executable code may be provided that deciphers the encrypted information and processes the anonymous identifier. Executable code may be provided that retrieves stored information corresponding to the authenticating of the device that is stored on the host. The host may be an access point of an access controlled system and upon presentation of the device at the access point, the access point may authenticate the device and establish a shared secret with the device to obtain an access credential, and the access point may rely on the access control system to validate the access credential for authorization and granting access.

According further to the system described herein, a method for authenticating a device includes receiving, at the device, a request to authenticate the device. The method further includes generating a response to the request. The method further includes sending the response to a host, where the response includes encrypted information and an anonymous identifier of the device that does not provide readable identification information to an entity other than the host, and where the response authenticates the device to the host. The anonymous identifier and/or the encrypted information may be a one-time use identifier of the device. The device may generate the encrypted information using information provided in the request and/or a key derived from a shared secret of the device and the host. The method may further include authenticating the host at the device. The method may further include retrieving stored information corresponding to the authenticating of the host that is stored on the device. The host may be an access point of an access controlled system and the device may request access to an access controlled terminal.

According further to the system described herein, a non-transitory computer readable medium stores computer software for authenticating a device. The computer software may include executable code that receives a request to authenticate a device. Executable code may be provided that generates a response to the request. Executable code may be provided that sends the response to the host wherein the response includes encrypted information and an anonymous identifier of the device that does not provide readable identification information to an entity other than the host and in which the response authenticates the device to the host. The anonymous identifier and/or the encrypted information may be a one-time use identifier of the device. The encrypted information may be generated using at least one of: information provided in the request and a key derived from a shared secret of the device and the host. Executable code may be provided that authenticates the host to the device. Executable code may be provided that retrieves stored information corresponding to the authenticating of the host that is stored on the device. The host may be an access point of an access controlled system and upon presentation of the device at the access point, the access point may authenticate the device and establish a shared secret with the device to obtain an access credential, and the access point may rely on the access control system to validate the access credential for authorization and granting access.

According further to the system described herein, a system for authenticating a device includes a host and a device that authenticates to the host. The host may include a non-transitory computer readable medium that includes: executable code that generates authentication information at the host; executable code that sends a request to authenticate the device, where the request includes at least a portion of the authentication information; executable code that receives a response to the request from the device, where the response includes encrypted information and an anonymous identifier of the device that does not provide readable identification information to an entity other than the host; and executable code that authenticates the device using the encrypted information and the anonymous identifier. The device may include a non-transitory computer readable that includes: executable code that receives the request; executable code that generates the response; and executable code that sends the response to the host, where the response authenticates the device to the host. The host may include a client application and a secure access module. The device may include at least one of: a smart card and a mobile phone including a secure element. The request sent from the host to the device may be unencrypted, and a portion of the encrypted information in the response may be encrypted using the portion of the authentication information. Each of the host and the device may use a shared secret which may be one of: established by the device before sending back the response to the request to the host and established in advance before sending authentication information from the host. A portion of the encrypted information in the response may be encrypted using a key derived from the shared secret. The host may be an access point of an access controlled system and upon presentation of the device at the access point, the access point may authenticate the device and establish a shared secret with the device to obtain an access credential, and the access point may rely on the access control system to validate the access credential for authorization and granting access.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

The system described herein provides an open protocol for access control identification and ticketing with privacy (hereinafter "OPACITY") and is generally applicable for uses involving authentication and key establishment with privacy. According to various embodiments, OPACITY may provide a suite of authentication and key agreement protocols for contact or contactless interfaces that can secure physical access, logical access, transportation applications and/or implement other applications requiring secure communications.

Figure 1:
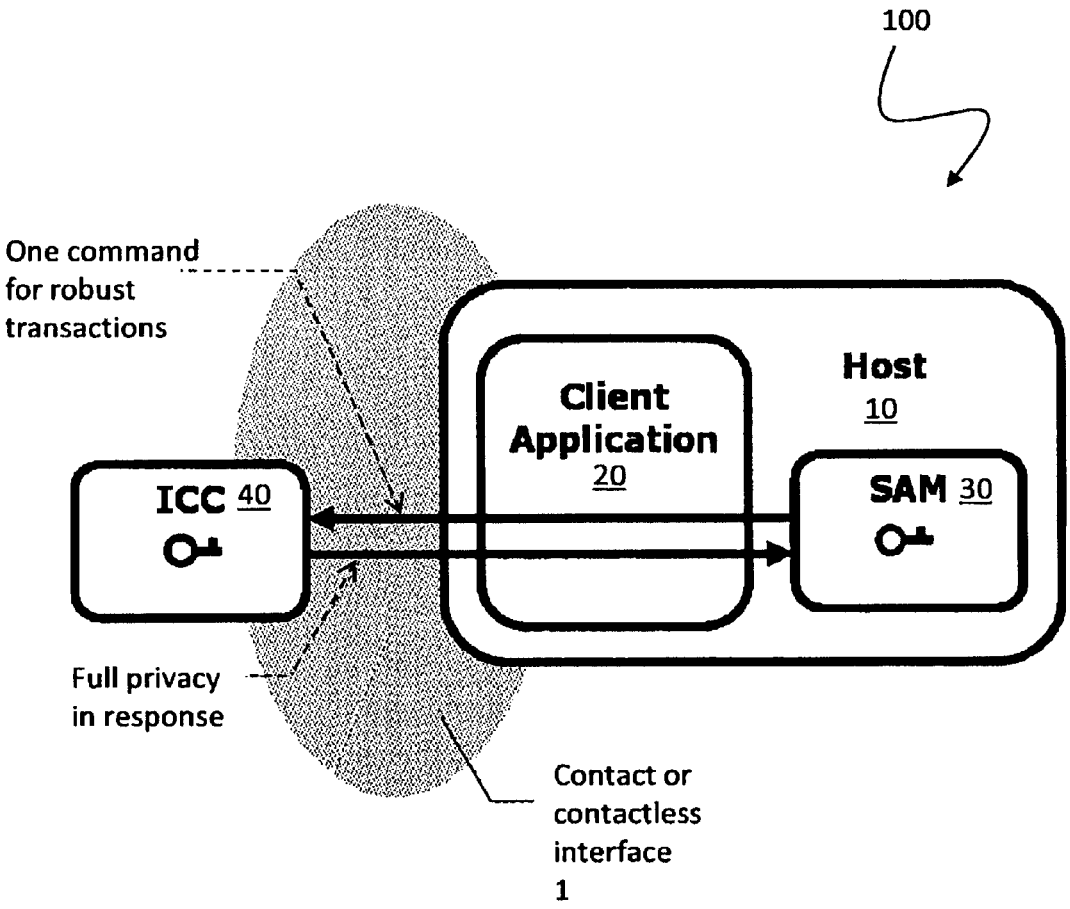
FIG. 1 is a schematic illustration of an OPACITY system according to an embodiment of the system described herein.

FIG. 1 is a schematic illustration showing an overview of an OPACITY system 100 according to an embodiment of the system described herein. A host 10 that may be a terminal and/or sewer with protected access may include a client application 20 and a secure application module (SAM) 30. Although discussed principally herein in connection with use of a SAM, the system described herein may also operate in connection with devices using a trusted platform module (TPM), hardware security module (HSM) and/or other type of cryptographic module, such as a software module, or a module embedded in a CPU. Furthermore, although the client application 20 is shown and discussed principally herein as a separate component with separate functionality from the SAM 30, in other embodiments, the client application 20 may be incorporated into the SAM 30.

An ICC 40, such provided on a smart card, mobile phone and/or other personal device, communicates with the SAM 30 via a contact or contactless interface 1. Operation of the protocols of the OPACITY system 100 provide secure contact or contactless communication between the ICC 40 and the SAM 30. For example, use of the system described herein may provide full protection from attacks including skimming, sniffing and man-in-the middle attacks and may provide forward secrecy, as further discussed elsewhere herein. An OPACITY protocol according to the system described herein may advantageously use a single command for robust transactions and full privacy in the response. Note that the host may be a computing system such as a terminal or remote server, and/or any other unit or collection of units capable of establishing a logical communication channel with the device (e.g., the ICC 40) as discussed herein.

The OPACITY system 100 may include a protocol suite including protocols for operations of the SAM 30, ICC 40 and/or client application 20 that may operate in compliance with NIST cryptographic mandates, including NIST SP 800-56A or 800-56B (as noted above and which is incorporated herein by reference), NIST SP 800-57 Part 1, entitled "Recommendation for Key Management" by Elaine Barker et al. (revised, March 2007), which is incorporated herein by reference, and Federal Information Processing Standards (FIPS) 140-2, entitled "Security Requirements for Cryptographic Modules," May 25, 2001, with change notice 12-03-2002, which is incorporated herein by reference. The protocol suite may further include the ability to fulfill NSA recommendations on the choice of cryptography (SUITE-B). It should be noted that other appropriate standards may also be utilized in connection with the system described herein, as would be understood by one or ordinary skill in the art.

The OPACITY system 100, and protocols therefor as further discussed elsewhere herein, may offer multiple advantages in security, fast and robust operation, and integration. In connection with security, the system 100 may prevent identity leaks and privacy protection may be maximum, including that both Personally Identifiable Information and Unique Identifiers cannot be accessed by unauthorized parties. The system 100 may provide forward secrecy, including that previously transmitted secrets cannot be revealed in the clear even if the static host or ICC authentication key has been compromised. The system 100 may provide mutual authentication in which host authentication to the card is either implicit or explicit. In implicit mode, only the host with a trusted private key can decrypt the card output, so the card receives assurance that only an authentic and authorized host can use the card output. In explicit mode the host applies secure messaging on card commands, so the card receives assurance that an authentic and authorized host has effectively received the card output. The system 100 may support full secure messaging for application data or key exchange. The system 100 may be robust to Man-In-The-Middle attacks with proof of possession of both private and derived session keys. The system 100 may provide protection against theft with activation control mechanisms. The system may provide key revocation support with a configurable trusted public key list.

In connection with fast and robust operation, the system 100 may have zero or reduced overhead and in which there is one short command and one short response. The system 100 may be robust to power off in any situation and have the capability to resume. Extremely fast and scalable session key establishment may be provided when the protocol is executed a second time between a card and a host.

In connection with integration, integration specifications for both the SAM 30 and ICC 40 interfaces may be provided for the system described herein. From the client application perspective, the integration may be simple with the use of a single ICC command with a SAM-generated public key and identification data. An ICC response is directly forwarded to the host SAM 30 for processing. The SAM 30 returns authenticated ICC credentials. Session keys (e.g., symmetric session keys) are established on both sides. The system 100 may provide simple PKI key management and limited infrastructure implementation costs.

Figure 2:
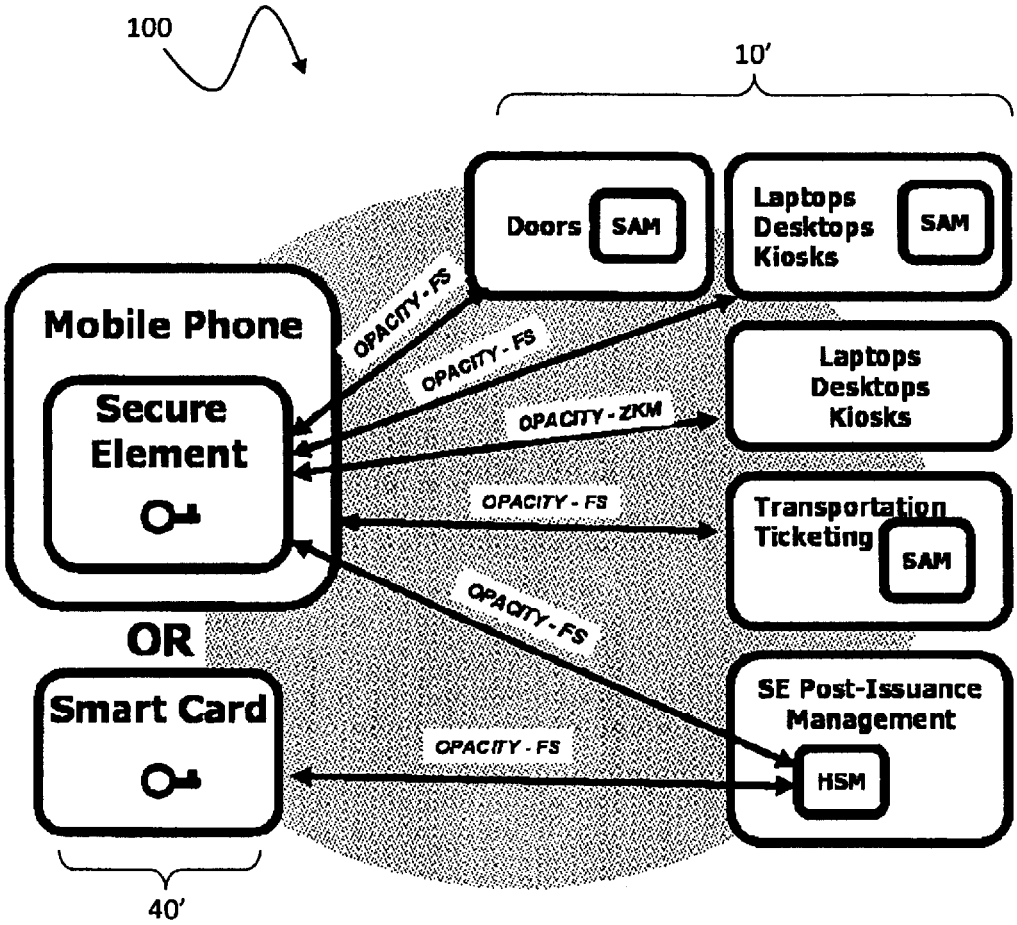
FIG. 2 is a schematic illustration showing use cases of OPACITY according to various embodiments of the system described herein.

FIG. 2 is a schematic illustration showing use cases of the OPACITY system 100 according to various embodiments of the system described herein. The system described herein may provide a compact flexible secure and fast authentication protocol with secure messaging capability. It may cover many types of cases requiring mutual authentication or secure messaging. It may also extend the use of known protocols by offering additional protection mechanisms that reduce or prevent risks of usage in contactless or unprotected environments.

The protocol suites of the OPACITY system 100 may provide authentication, such as PM authentication, of a ICC of a smart card and/or mobile phone with a secure element 40' that may be presented to one or more hosts 10' . The hosts 10' may include one or more hosts that are part of and/or otherwise incorporated into a door or door controller for controlling physical access and into desktops, laptops and/or kiosks for controlling logical access. Use of secure messaging provides an end-to-end protected path for document or transaction decryption and signatures using the secure element or smart card. The end-to-end secure messaging may provide for the transport of PIN or biometrics or physical access control system (PACS) credentials via contactless communication. The system described herein may also be used in connection with PM-based authentication and ticketing for transit applications. The system described herein may further be used to provide end-to-end post issuance management of the smart card or secure element in a contact or contactless environment.

In various embodiments, the protocol suite of the system described herein may include modes of different strengths that may be applied to various use cases or eco-systems (see FIG. 2). A first mode of the OPACITY protocol may be an OPACITY Forward Secrecy mode (OPACITY-FS) that may be optimized for contact or contactless authentication transactions such as for access to sensitive facilities but also when it is necessary that the identity of the cardholder never be compromised. An external third-party without privilege should not be able to associate the identity of the card holder to a transaction made with the card. Under the OPACITY-FS mode, the protocol of the system described herein also protects end-to-end sensitive information that may be transported to or from the card and which remains valuable after the transaction or the session is completed. For instances in key management use cases, information communicated may remain critical and need to be protected for a long period of time.

A second mode of the OPACITY protocol may include an OPACITY Zero Key Management (ZKM) mode (OPACITY-ZKM) that may be a lightweight option best suited to protect contact or contactless communications when terminals are not capable of supporting a security module, operating secrets and the corresponding key life cycle management, such as in legacy Physical Access Control or Logical Access Control deployment infrastructures. The OPACITY ZKM mode may have similar security properties as the ActivIdentity SMA (secure messaging anonymous) protocol suite. For further discussion of the standards for supporting zero key management mode, reference is made to the standard ISO 24727-3 "EC Key Agreement with ICC Authentication, Appendix A-1" which is incorporated herein by reference.

Figure 3A:
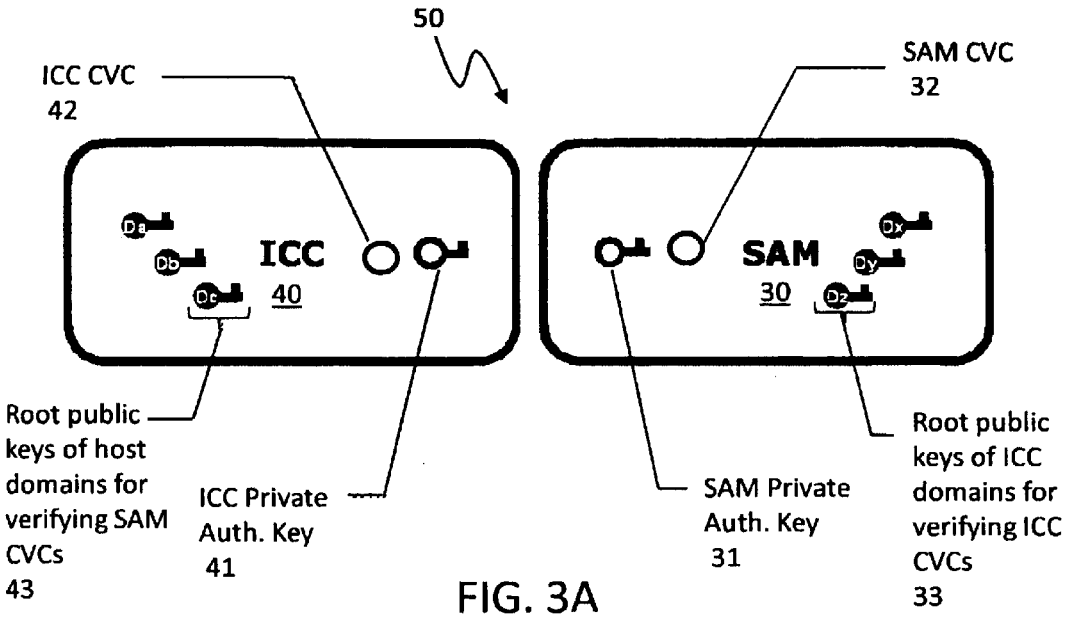
FIGS. 3A and 3B are schematic illustrations showing use of the OPACITY protocol in connection with key management techniques according embodiments of the system described herein.
Figure 3B:
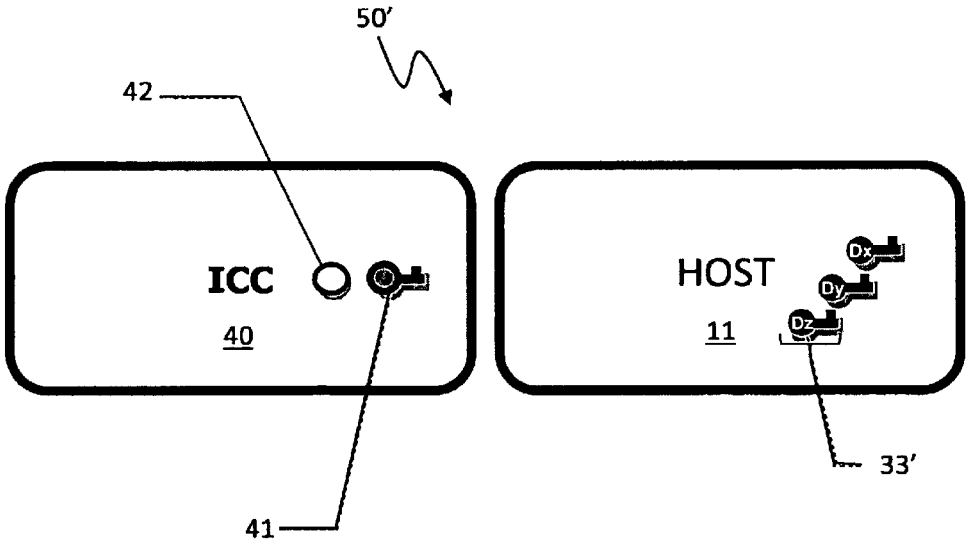

FIGS. 3A and 3B are schematic illustrations showing use of the OPACITY protocol in connection with key management techniques according embodiments of the system described herein.

FIG. 3A is a schematic illustration 50 showing use of the OPACITY protocol in connection with the forward secrecy (FS) mode according to an embodiment of the system described herein. OPACITY key management may be advantageously simple and regular. Each OPACITY-enabled crypto module of the ICC 40 and SAM 30 may include a private authorization key 31, 41, such as a single persistent Elliptic Curve (BC) private key, and a corresponding Card Verifiable Certificate (CVC) 32, 42. Each SAM 30 or ICC 40 may also include a list of root public keys for each domain. The SAM 30 may include a list of root public keys 33 (Da, Db, Dc) of ICC domains for verifyng ICC CVCs. The ICC 40 may include a list of root public keys 43 (Dx, Dy, Dz) of SAM domains for verifying SAM CVCs. These keys are used for validating the CVCs of other OPACITY devices willing to communicate.

The OPACITY-FS mode provides for operation with advantageous privacy, authentication and forward secrecy features. The OPACITY protocol may not divulge any identifier that may be associated to a particular ICC or card holder during an OPACITY session and does not divulge any data that allows the correlation of two protocol executions with the same ICC during the OPACITY session. In an embodiment, the OPACITY protocol may explicitly authenticate the ICC 40 to the host using FIPS-approved BC-based authentication protocols described in NIST SP 800-56A. The ICC 40 may deliver the CVC 42 to the host 10/SAM 30, which allows the host 10 to verify the binding between the ICC identifier and the ICC BC private key 41. The ICC identifier may be chosen to be the same value registered in the access control system (for instance, GUID or FSC-N). The OPACITY protocol may either implicitly or explicitly authenticate the host to the ICC, for example, using FIPS-approved BC-based authentication protocols described in NIST SP 800-56A. Implicit authentication means that the ICC validates the CVC but does not expect a response from the host showing that the host actually owns the private key corresponding to that CVC. However, only an authentic host will be able to decipher the ICC response. Explicit authentication means that the ICC actually receives at least an additional command from the host that proves to the ICC that the host owning the private key is present. Forward secrecy provides assurance that the encrypted data that is transferred cannot be decrypted after the communication has ended and the session keys and the ephemeral EC key pairs are zeroized (destroyed). This mode is particularly useful when OPACITY is used for secure messaging (SM) encryption. Specifically, with forward secrecy, the SM session keys cannot be reproduced even if both the original persistent key material and the original communication data has been compromised or captured. In the OPACITY case, the original persistent key material may correspond to the private terminal authentication keys.

FIG. 3B is a schematic illustration 50' showing use of the OPACITY protocol in connection with zero key management (ZKM) techniques for a host terminal 11 that does not have or support a SAM according to an embodiment of the system described herein. As further discussed elsewhere herein, the protocol according to the system described herein may have an operating mode that minimizes key management requirement for the host terminal 11 with no SAM available locally or remotely (and/or a SAM with no private authentication key or CVC), as may be the case with legacy Physical Access Control infrastructure. The ZKM mode does not require static terminal keys except for the root public key 33' of the domain of the ICC 40 that is used by the host 11 to verify the CVC 42 of the ICC 40. The ZKM mode may provide ICC 40 authentication, but not host terminal 96 authentication, and may be used in environments where terminals are known and trusted. Also, ZKM mode may not protect against identity leaks and its privacy protection qualities are lower than the other modes of the OPACITY protocol. The basic ZKM authentication protocol may be an ICC internal authentication protocol and key agreement using BC cryptography. The initiator may generate an ephemeral key pair but has no static key pair; the responder has only a static key pair.

The protocol of the system described herein may be configured for use with multiple cipher suites. TABLE 1 shows configurations for three cipher suites: non-government cipher suite; enterprise or government unclassified cipher suite, and government classified cipher suite using encryption algorithms and standards such as: two key Triple Data Encryption Algorithm (2TDEA), Advanced Encryption Standard (AES) (e.g., AES 128/256), Elliptic Curve Diffie-Heilman (ECDH) (e.g., ECDH 160/256/384), Elliptic Curve Digital Signature Algorithm (ECDSA) (e.g., ECDSA 160/256/384) and Secure Hash Algorithm (SHA) (e.g., SHA 1/256/384). The system described herein may further be used with other suitable cipher suites and encryption standards beyond those described in TABLE 1.

TABLE 1

| | Non Government Cipher suite | Enterprise or Government Unclassified Cipher suite | Government Classified Cipher suite |
|---|---|---|---|
| Encryption or MAC (Session keys) | 2TDEA | AES128 | AES256 |
| PKI ICC Authentication Or Digital Signature | ECDSA 160 | ECDSA 256 | ECDSA 384 |
| SKI ICC Authentication Or Digital Signature | 2TDEA | AES128 | AES256 |
| Host Authentication Or Digital Signature | ECDSA 160 | ECDSA 256 | ECDSA 384 |
| Key Exchange | ECDH 160 | ECDH 256 | ECDH 384 |
| Hashing | SHA 1 | SHA 256 | SHA 384 |

Figure 4:
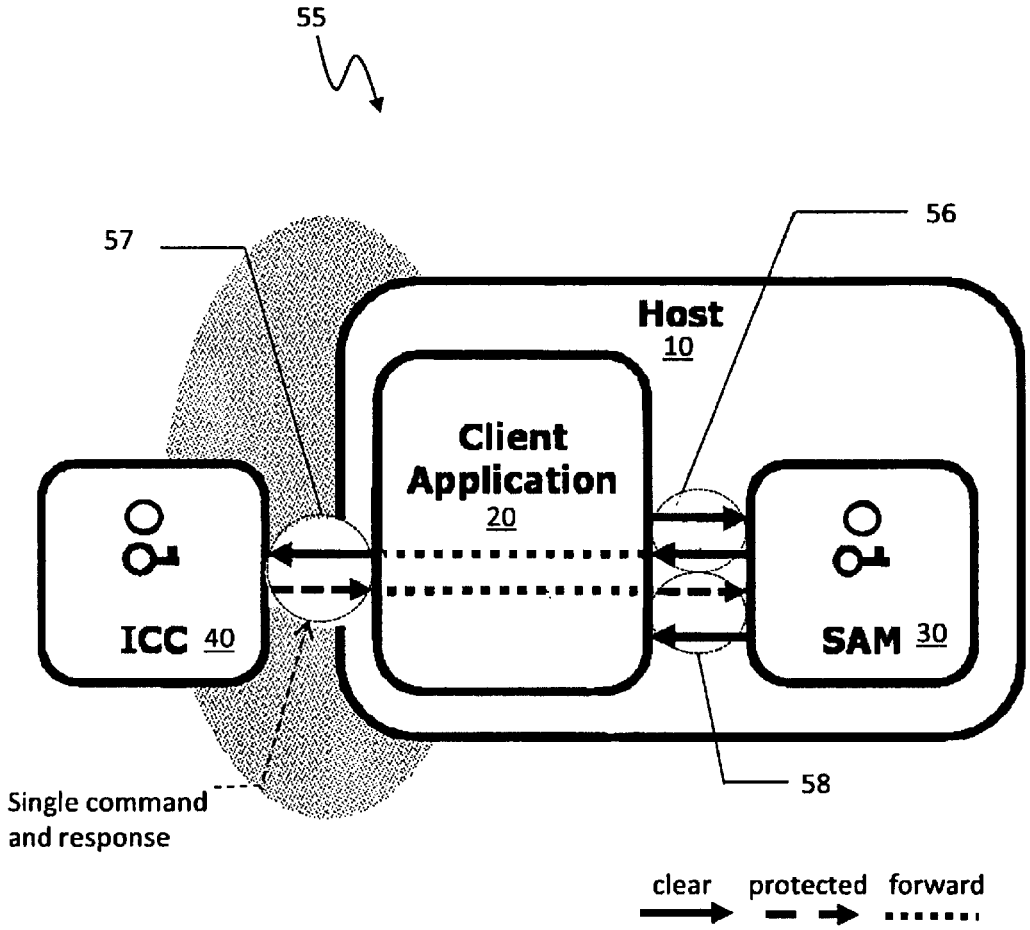
FIG. 4 is a schematic illustration showing the command flow of the OPACITY protocol according to an embodiment of the system described herein.

FIG. 4 is a schematic illustration 55 showing command flow of the OPACITY protocol according to an embodiment of the system described herein. The OPACITY protocol may be optimized to be implementable as a single ICC command-response transaction between the host 10 (including the client application 20 and SAM 30) and the ICC 40 (e.g., a smart card). An ID credential, for instance a global unique identification (GUID) or FSC-N may be authenticated in a single command. The OPACITY protocol may include steps of generating a SAM key pair (56), authenticating the SAM 30 to the ICC 40 (57) and authenticating the ICC 40 to the SAM 30 (58). In this figure (and other corresponding figures), a solid arrow indicates a clear transmission, a dashed arrow indicates a protected transmission and a dotted line indicates forwarding of information (e.g., command/response). The illustrated behavior simplifies the transaction between the host 10 and the ICC 40 by simplifying integration of the SAM 30 and reduces command processing overhead, which is desirable for fast, contactless transactions.

Figure 5:
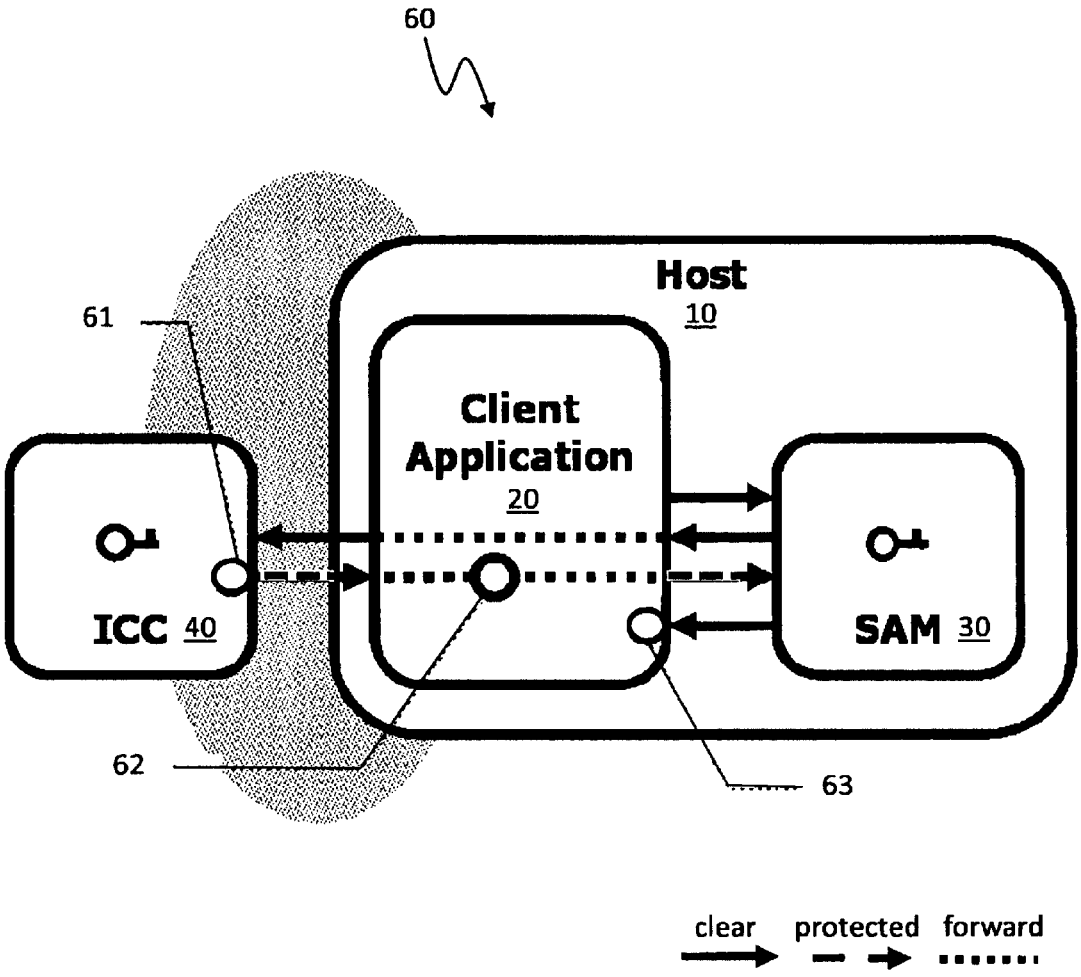
FIG. 5 is a schematic illustration showing use of the OPACITY protocol according to an embodiment of the system described herein for securely transferring an ID credential.

FIG. 5 is a schematic illustration 60 showing use of the OPACITY protocol according to an embodiment of the system described herein for securely transferring an ID credential (e.g., a GUID) 61 stored in the ICC 40 to the client application 20 on the host 10 and authenticating the ID credential (e.g., a GUID) to provide an authenticated ID credential 63 to the client application 20 using the SAM 30. Under the OPACITY protocol, the credential 61 stored in the ICC 40 is not exposed at the smart card edge and cannot be used to identify the smart card or the holder thereof (except, of course, by the SAM/host 10). The privacy protected response 62 from the ICC 40 with the protected ID credential may be forwarded through the client application 20 to the SAM 30 for authentication. The authenticated ID credential 63 may then be provided to the client application 20 via the SAM 30. In an embodiment herein, the privacy protected response 62 may be encrypted in a way that so that the response 82 is readable by the SAM/host but not by other entities that are not part of the transaction. In addition, each time the ICC 40 responds, the privacy protected response 62 may be different and may appear random to an entity other than the SAM/host. Thus, readable identification information is provided to the SAM/host, but not to other entities outside the transaction.

Figure 6:
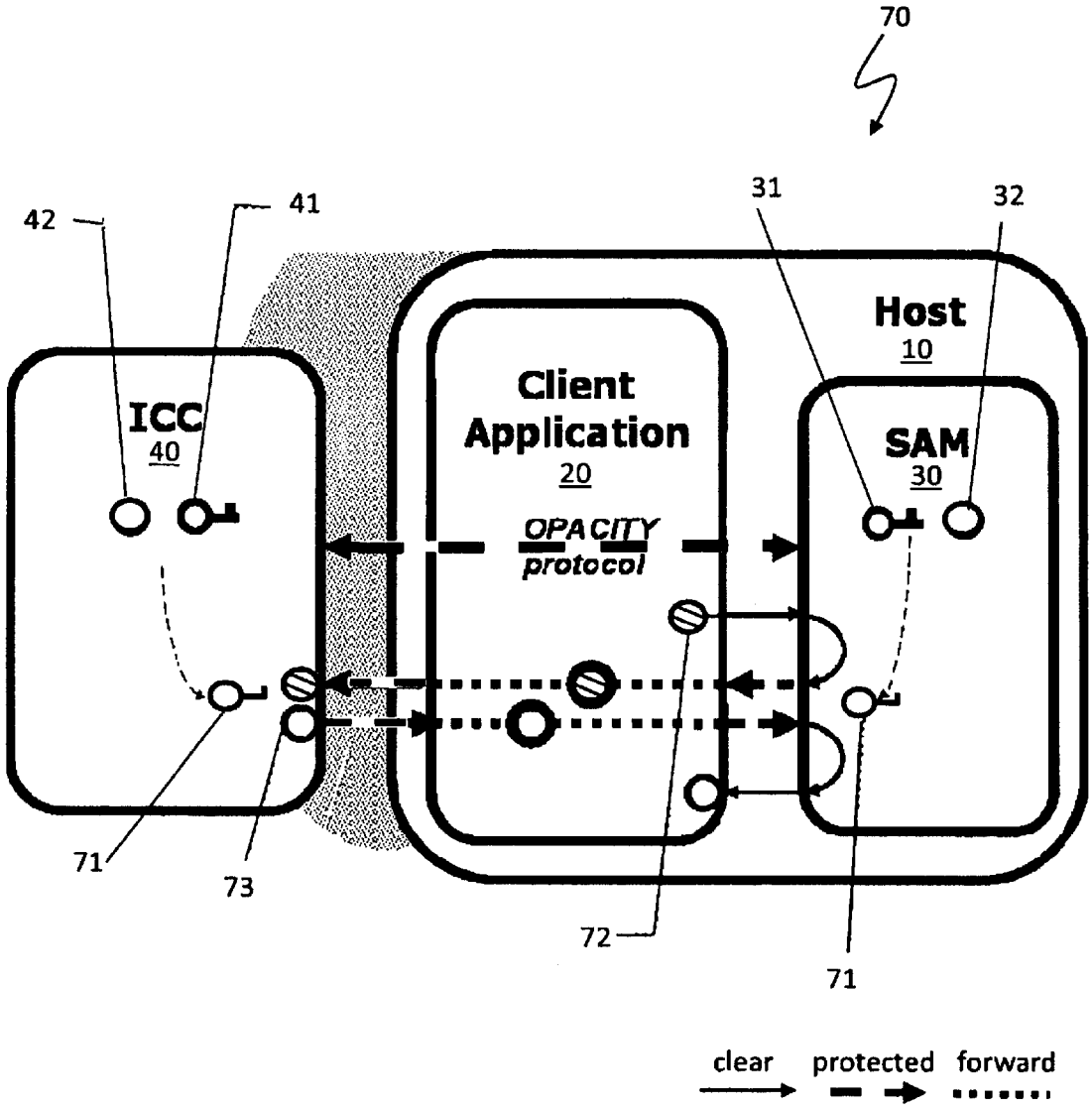
FIG. 6 is a schematic illustration showing use of the OPACITY protocol according to an embodiment of the system described herein for secure messaging.

FIG. 6 is a schematic illustration 70 showing use of the OPACITY protocol according to an embodiment of the system described herein for secure messaging. The OPACITY protocol may establish session keys 71 (e.g., AES session keys), available on both the host 10 and the ICC 40. The session keys 71 may be used to protect further commands and responses to and from the ICC 40 using a secure messaging (SM) mechanism such as GlobalPlatform SCP03. The session keys 71 protect the ICC commands for confidentiality, integrity of the command and integrity of the response. The secure messaging maintains the privacy and forward secrecy protection security obtained during the key establishment. Interoperable implementations may follow the ISO 7816-4 Annex B secure messaging standards such as ISO 24727-4 or ANSI GICS-1 Secure Messaging. Trusted application data 72, such as a PIN, may be stored on the client application 20 and securely provided to the ICC 40 via the SAM 30. Trust application data 73, such as a biometric template, may be stored on the ICC 40 and securely provided to the client application 20 via the SAM 30.

It should be noted that the OPACITY system may provide for the resuming of interrupted communications between the ICC 40 and the host 10, such as when the smart card (and/or mobile phone with secure element) leaves the communications field prematurely and then returns. The host 10 may issue a new request as if a new card is presented, e.g., with a new nonce or ephemeral public key. When the smart card recognizes that the host certificate is identical to the one of the previous failed connection, the ICC 40 can resume the processing at the point where it failed.

Figure 7:
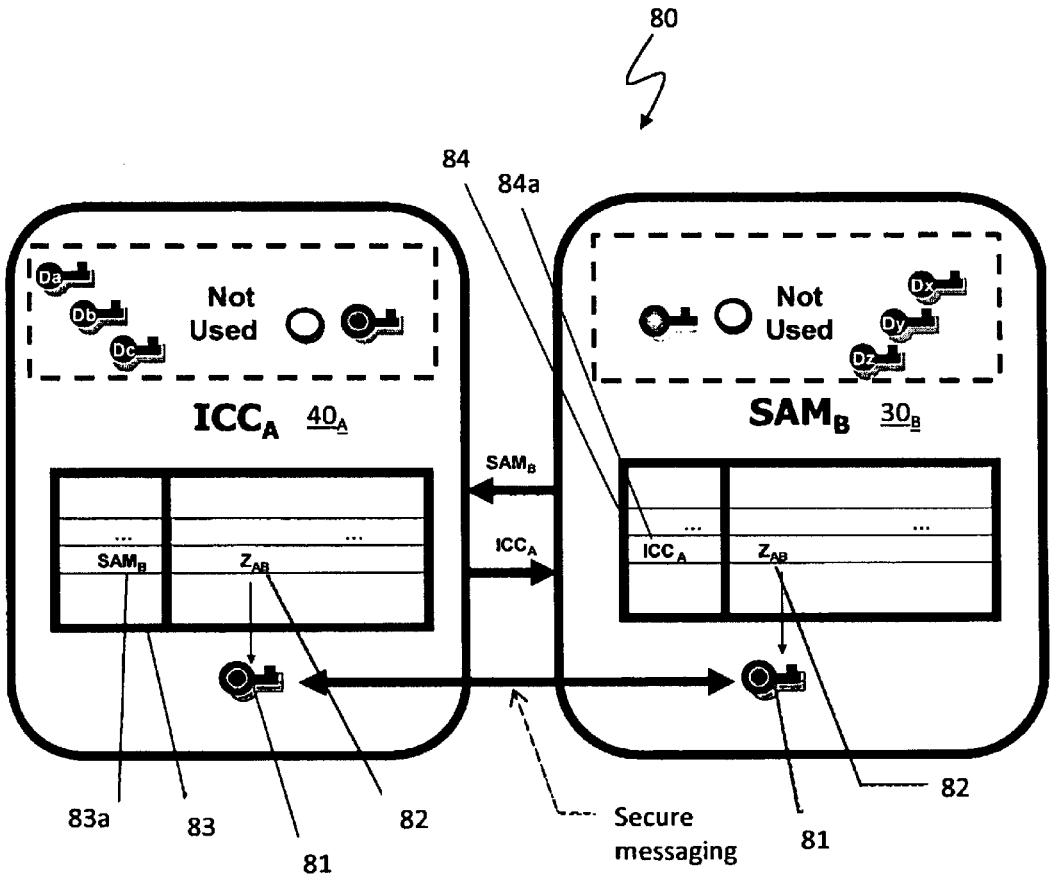
FIG. 7 is a schematic illustration showing use of the OPACITY protocol in connection with persistent binding between the host SAM and the ICC.

FIG. 7 is a schematic illustration 80 showing use of the OPACITY protocol in connection with persistent binding between the host SAM $\mathbf{30}_B$ and the ICC $\mathbf{40}_A$ . OPACITY is optimized to rapidly initiate transactions between the ICC $\mathbf{40}_A$ and the host SAM $\mathbf{30}_B$ (or TPM, HSM, etc.) that have already exchanged session key material 81. Shared secrets and one-time card identifiers 82 (e.g., shared secret $Z_{AB}$) for use in the next transaction are calculated and stored on each side in an entry 83*a*, 84*a* of a persistent binding table 83, 84. Persistent binding between a host SAM and a card ICC allows both sides to rapidly derive new session keys for authentication or secure messaging from previously registered binding data related to that unique ICC-host relationship. De-synchronization of persistent binding records may occur when the ICC $\mathbf{40}_A$ or the SAM $\mathbf{30}_B$ is unilaterally erased from the respective SAM or ICC persistent binding tables 83, 84. Another de-synchronization situation occurs when the OPACITY response from the ICC $\mathbf{40}_A$ never reaches the SAM $\mathbf{30}_B$ although the ICC $\mathbf{40}_A$ has newly registered a shared secret. The OPACITY protocol allows the SAM $\mathbf{30}_B$ and ICC $\mathbf{40}_A$ to resynchronize after being desynchronized.

Figure 8:
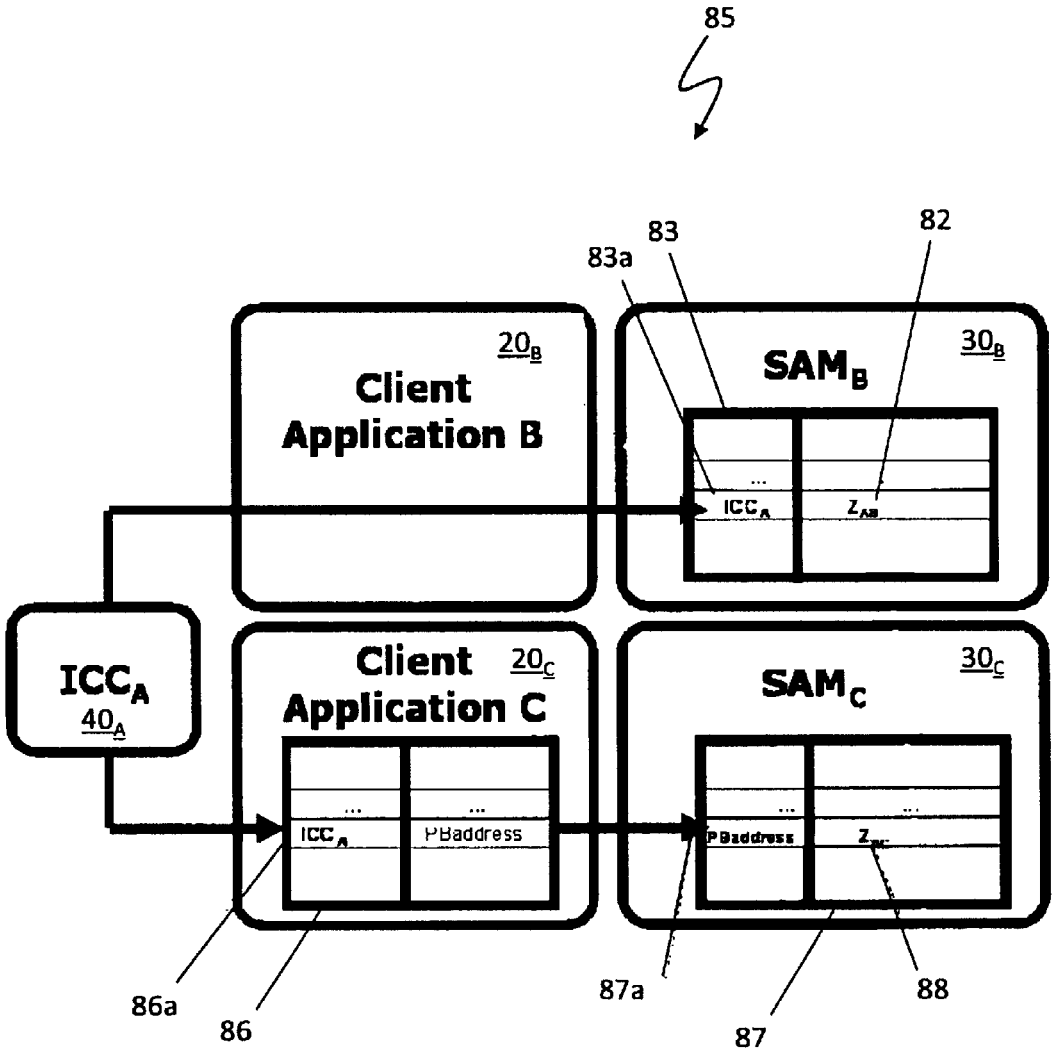
FIG. 8 is a schematic illustration showing use of the OPACITY protocol in connection with scalable persistent binding according to an embodiment of the system described herein.

FIG. 8 is a schematic illustration 85 showing use of the OPACITY protocol in connection with scalable persistent binding according to an embodiment of the system described herein. When a large number of ICCs needs to be registered in a SAM persistent binding table, the time needed to find the entry referencing the shared secret with the correct ICC index may be significant. Accordingly, for a small persistent binding table (e.g., less than 100 records), the records may be indexed and searched from the persistent binding table 83 on the $\mathrm{SAM}_B$ $\mathbf{30}_B$, like that discussed elsewhere herein in connection with the illustration 80, and without requiring searching by the client application $\mathbf{20}_B$. However, for a large persistent binding table (e.g., greater than 100 records), the records may be indexed and searched via the client application $\mathbf{20}_C$ on the host to allow for a faster determination of the index of the entry 86*a* of the persistent table 86 for the $\mathrm{ICC}_A$ $\mathbf{40}_A$. This results in faster access by the SAM $\mathbf{30}_C$ to contents 88 (e.g., shared secret ZAC) of the entry 87*a* of the persistent binding table 87 accessed by the SAM $\mathbf{30}_C$.Accordingly, the protocol of the system described herein allows for utilization of such persistent binding scalability so that the SAM can efficiently access persistent binding table entry contents regardless of the number of ICCs registered in the persistent binding table.

It should be noted that the OPACITY protocol workflow may be advantageously simple from an integrator's perspective. From the integrator's perspective, the client application 20 calls the SAM 30 to generate an ephemeral EC key pair, sends an authentication command to the ICC 40 including the public ephemeral key and the SAM ECC (see, e.g., FIG. 6). Then, the client application 20 forwards directly the authentication response of the ICC 40 as a second authentication command to the SAM 30. If successful, then session keys are established on both sides. The client application 20 builds application protocol data unit (APDU) commands, calls the SAM 30 to wrap (encapsulate) the APDU commands, and then sends the wrapped commands to the ICC 40. In an embodiment, the APDU interface may be an ISO 7816-4 card edge interface that supports the OPACITY protocol and may be desirable for interoperability.

Figure 9:
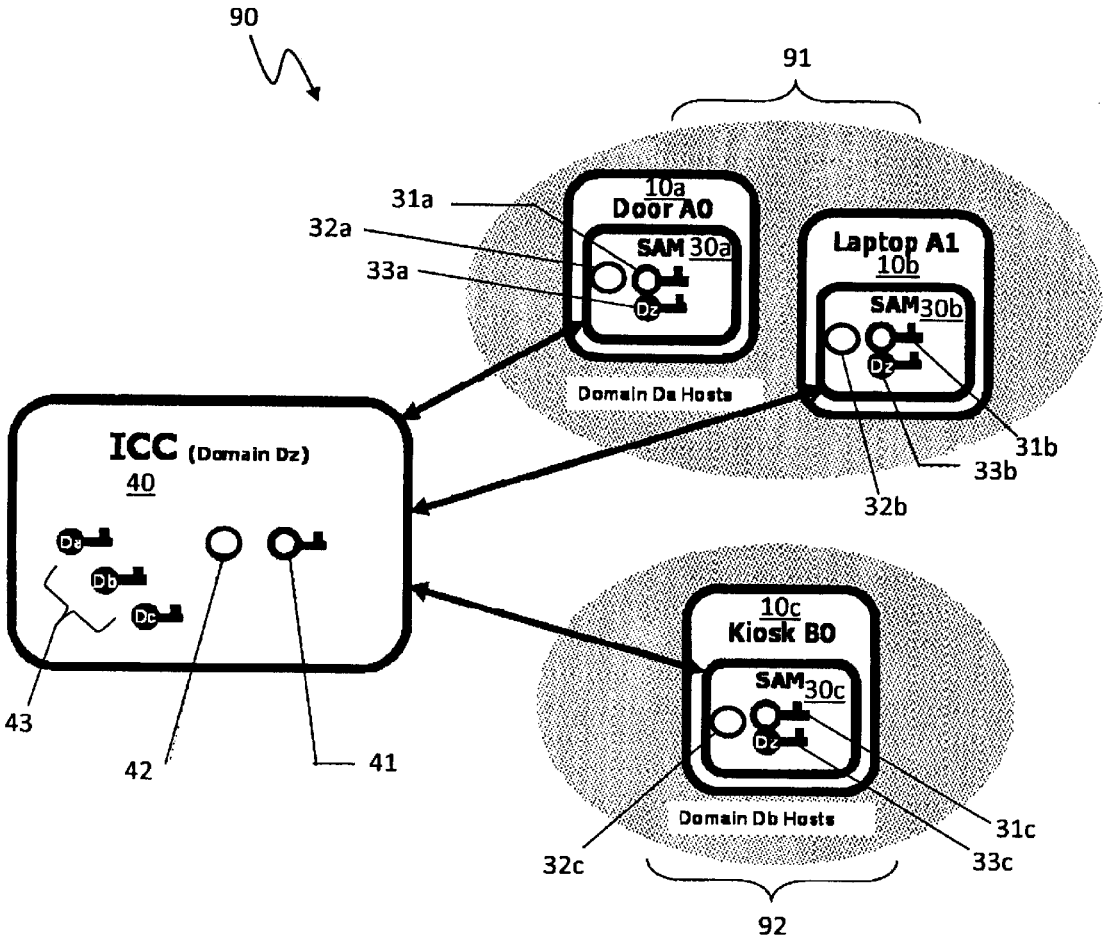
FIG. 9 is a schematic illustration showing use of the OPACITY protocol in connection with cross-domain authentication according to an embodiment of the system described herein.

FIG. 9 is a schematic illustration 90 showing use of the OPACITY protocol in connection with cross-domain authentication according to an embodiment of the system described herein. Two host domains Da 91, Db 92 are shown, in which each domain may include a set of hosts and an underlying system managed under the same authority. The domain 91 is shown including hosts 10*a*, l0*b* (Door A0 and Laptop Al) and the domain 92 is shown including the host l0*c* (Kiosk B0). To enable the OPACITY protocol, each of the hosts 10*a-c* may be equipped with a SAM 30*a-c* protecting a private host authentication key 31*a-c*. Each host authentication key 3l*a-c* has a companion CVC 32*a-c*. Each of the hosts 10*a-c* may be capable of transmitting its CVC 32*a-c*. Each of the SAMs 30*a-c* may include a list of root public keys 33*a-c* of the ICC 40 domain (Domain Dz) for verifying the ICC's CVC 42 that corresponds to the ICC's private authentication key 41. Each of the host CVCs 32*a-c* may be signed with a "root domain private key" which provides some assurance that the binding between the host and the authentication key is approved by the domain authority. OPACITY enabled cards may include the root domain public keys 43 to enforce host CVC verification and host authentication. An OPACITY enabled card may potentially interact with multiple domains and may therefore include multiple root domain public keys 43.

It should be noted that the protocol according to the system described herein may protect and authenticate data transported to and from the ICC in any environment. It may not be required that PKI authorization or revocation be enforced on behalf of access control systems using the protocol. In various embodiments, it may be assumed that the OPACITY keys are authentication keys generated on the ICC; these keys being never shared. However the ICCs may be stolen or operated in unauthorized contexts. Accordingly, the life cycle of the OPACITY authentication keys may be managed via the ICC post-issuance system in coordination with the life of the card. In particular, the ICC management system may be capable of regenerating the OPACITY static key pair, installing a corresponding CVC, and updating the list of authorized root domain public key. In case of theft, the security of the OPACITY-based system may rely on the prompt declaration of loss or theft to the Issuer, service provider or local IT. This may result in a) the actual revocation of the application credentials and associated rights (CHUID, PIV Auth Cert, etc.), which are not the OPACITY credentials, and b) may result in updates the corresponding access control backend. On the other hand the revocation of OPACITY CVCs and the use of CRLs or blacklist may not be required. Furthermore, the list of valid domain public keys may be regularly updated to phase out revoked cards.

Figure 10:
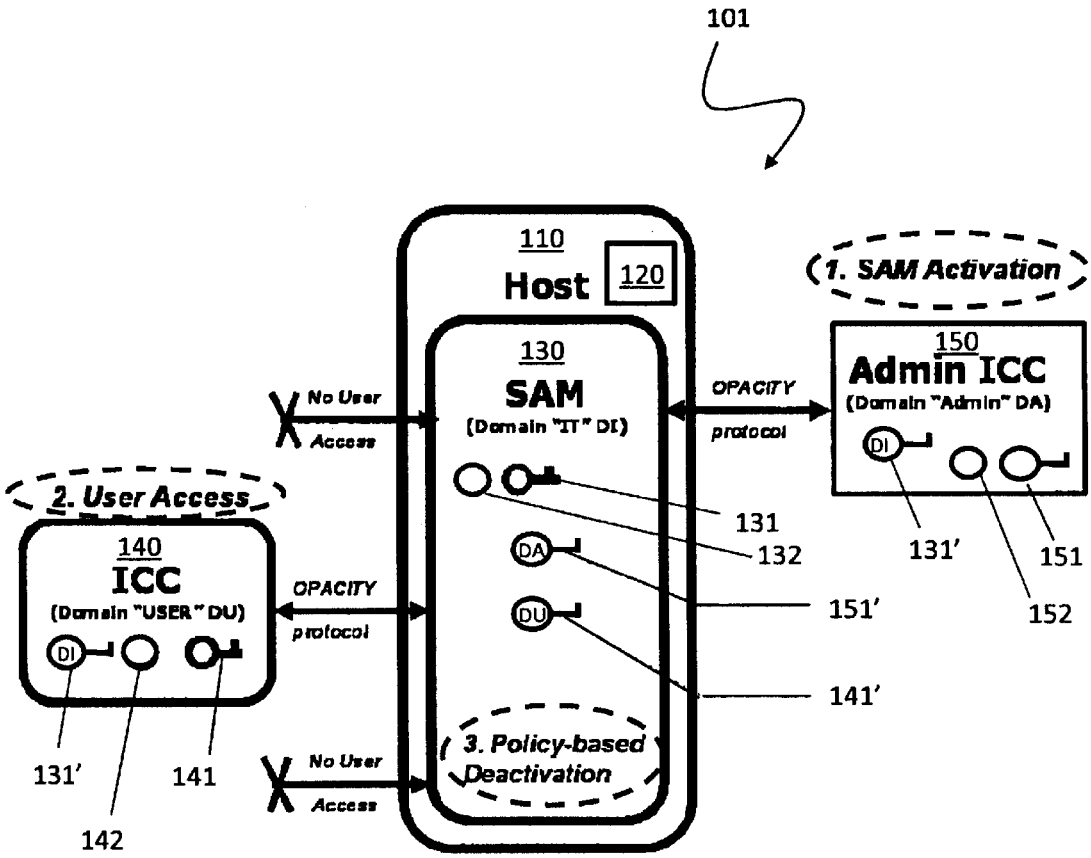
FIG. 10 is a schematic illustration showing use of the OPACITY protocol in connection with anti-theft techniques including SAM activation and deactivation according to an embodiment of the system described herein.

FIG. 10 is a schematic illustration 101 showing use of the OPACITY protocol in connection with anti-theft techniques including SAM activation and deactivation according to an embodiment of the system described herein. SAMs may only be active in an approved context of use. An attacker controlling a SAM may be able to capture sensitive identity information. Accordingly, the system described herein provides for flexible and enforceable SAM activation and SAM deactivation mechanism. The SAM activation mechanism may include a successful OPACITY authentication with a trusted "Administrator ICC" 150 with a CVC 152 which is signed with a domain administrator private key 151. The corresponding domain administrator root public key 151' (Domain DA) maybe stored on the SAM 130 and the domain root public key 131' (Domain DI) of the SAM 130 may be stored on the Administrator ICC 150 in connection with the successful OPACITY authentication between the SAM 130 and the Administrator ICC 150. Upon SAM activation (see step 1 in the figure), user ICC 140 access authentication is then performed using a successful OPACITY authentication between the ICC 140 and the SAM 130 (see step 2 in the figure). For example, the activation may be performed using the ICC private authorization key 141, the ICC CVC 142, the SAM private authorization key 131, the SAM CVC 132, the SAM root domain public key 131' (Domain Dl) stored on the ICC 140 and the ICC root domain public key 141' (Domain DU) stored on the SAM 130, as further discussed elsewhere herein. Subsequently, the SAM 130 may be deactivated according to a security policy and/or other deactivation procedure/policy (see step 3 in the figure) whereupon access to the SAM 130 (deactivated) is no longer permitted until the SAM 130 is again activated.

The Administrator ICC 150 may be a smart card and/or a secure element of a mobile phone which communicates to the SAM 130 via the client application 120 as a regular OPACITY-enabled card. The SAM 130 stores the Administrator ICC root domain public key 151' and the ICC root domain public key 141' of the user ICC 140 requesting access. The Administrator ICC 150 may also be a secure element attached to an online connected service, allowing real-time control of SAMs. If the SAM 130 is in a deactivated state, user access is not permitted to the host terminal 110. A deactivated SAM requires a successful OPACITY transaction with the Administrator ICC 150 prior to allow any other OPACITY transaction with another ICC 140. To deactivate a SAM, the SAM 130 may be: powered off then on; reset; the SAM application may be deselected; and/or an internal OPACITY transaction counter may reach a maximum, among other appropriate deactivation techniques. The counter may be reset upon activation.

It should be noted that key agreement, derivation and confirmation functions used in connection with the system described herein may comply with the standards set forth in NIST SP 800-56A, as further discussed elsewhere herein. Key establishment prerequisites may be executed on both the host and ICC sides prior to executing the protocol according to the system described herein. Each side may have authentic copies of the same set of domain parameters and obtain assurance of the validity of the parameters. Other appropriate key derivation standards may also be used in connection with the system described herein (see, e.g., NIST SP 800-108).

For the initial state of a host, the protocol according to the system described herein may initially be enabled on the host side. A client application executes on the host (with a host identifier $ID_{sH}$) that is equipped with a SAM (and/or HSM or TPM etc.) to implement the cryptographic functions and to communicate with a smart card or secure element (identifier $ID_{sICC}$). The client application may have access to a unique static private EC authentication key ($d_{sH}$) and the conesponding CVC ($C_H$) may include the host identifier ($ID_{sH}$) and the matching public key ($Q_{sH}$). The host may execute all key establishment preparations prior to launching the protocol according to the system described herein. The client application may have access to a registry of Host-ICC pairing records needed to support the persistent binding capability as further discussed elsewhere herein. Each record includes a ICC record identifier ($OTID_{ICC}$), and a one-time shared secret (Z) valid for the next communication. The registry may be accessed with the ICC record identifier ($OTIP_{ICC}$). If the ICC authentication settings are variable, the client application may ensure that the ICC authentication method and parameters are set. The client application may have access to the root ICC public key ($Q_{rootICC}$) to validate ICC authentication certificates ($C_{ICC}$) and card authentication public key ($Q_{sICC}$).

For the initial state of an ICC, the protocol according to the system described herein may initially be enabled on the ICC side. A certificate root public key ($Q_{rootH}$), for on card verification of the client application certificate, may be determined with a client certificate issuer identification number. The ICC may have access to a registry of host pairing records needed for the persistent binding capability. Each record may include: the host identifier and index ($ID_{sH}$), the one-time ICC identifier that was used during the last session ($OTID_{ICC}$), the one- time shared secret valid only for the next communication (Z). The card application may have access to a card authentication key ($d_{sICC}$) and a card authentication certificate ($C_{ICC}$) including the card authentication public key ($Q_{sICC}$). The ICC may execute all key establishment preparations prior to launching the protocol according to the system described herein.

FIGS. 11-13B are flow diagrams showing processing under the OPACITY protocol for OPACITY-FS mode performed by each of a client application on a host, a SAM on the host and an ICC attempting access via the host. Reference is made to the detailed discussion elsewhere herein of the host 10, the client application 20, the SAM 30 and the ICC 40 and/or similar components discussed elsewhere herein.

Figure 11:
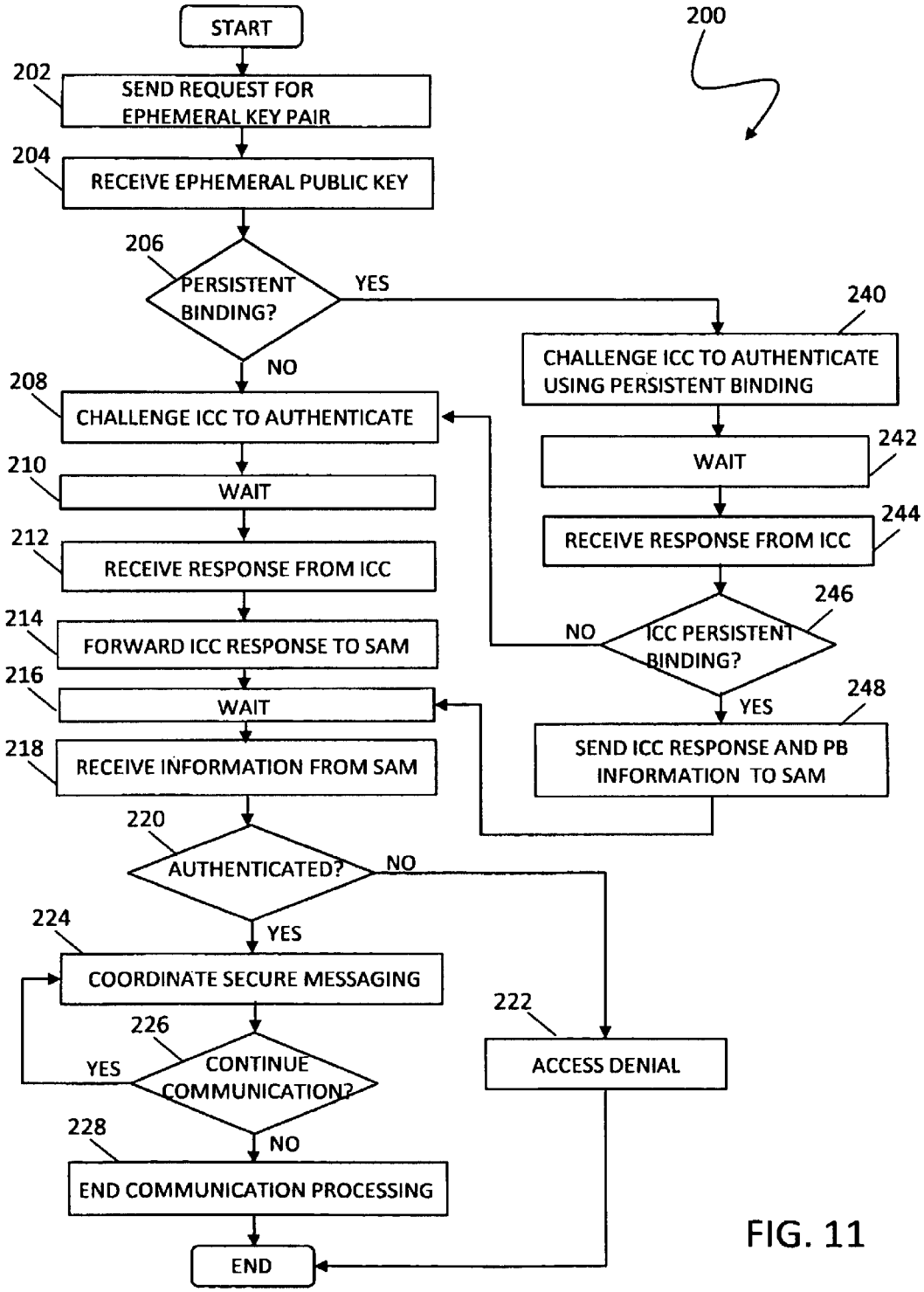
FIG. 11 is a flow diagram showing processing of the client application under the OPACITY protocol for OPACITY-FS mode according to an embodiment of the system described herein.

FIG. 11 is a flow diagram 200 showing processing of the client application under the OPACITY protocol for OPACITY-FS mode according to an embodiment of the system described herein. At a step 202, the client application sends a request to the SAM to generate an ephemeral key pair ($d_{eH}$, $Q_{eH}$), such an ephemeral EC key pair. After the step 202 processing proceeds to a step 204 wherein the client application receives the ephemeral public key ($Q_{eH}$) from the SAM. After the step 204 processing proceeds to a test step 206 where the client application determines whether persistent binding processing is configured and is to be used. If persistent binding processing is not to occur, then processing proceeds to a step 208 where the client application challenges the ICC to authenticate by sending an authentication request to the ICC that may include the host certificate ($C_H$), the ephemeral public key ($Q_{eH}$) and/or may include information indicating no persistent binding processing. In an embodiment, the authentication request is sent in the clear (unencrypted). After the step 208, processing proceeds to a step 210 where the client application waits to receive a response from the ICC. After the step 210, processing proceeds to a step 212 where the client application receives a response from the ICC. In an embodiment, the response from the ICC may be encrypted using the ephemeral public key generated by the SAM ($Q_{eH}$).

After the step 212, processing proceeds to a step 214 where the client application forwards the ICC response to the SAM to authenticate the ICC. Only an authentic SAM can decipher the ICC response since the ephemeral private key ($d_{eH}$) is retained by the SAM. As further discussed elsewhere herein, the ICC response may include an ICC record identifier ($OTID_{ICC}$) that may be an anonymous, one-time identifier of the ICC along with other encrypted information. In an embodiment herein, the ICC response may be encrypted in a way that so that the response is readable by the SAM/host but not by other entities (i.e., that are not part of the transaction). In addition, each time the ICC responds, the encrypted information may be different and may appear random to an entity other than the SAM/host. Thus, readable identification information is provided to the SAM/host, but not to other entities outside the transaction. After the step 214, processing proceeds to a step 216 where the client application waits to receive a response from the SAM. After the step 216, processing proceeds to a step 218 where the client application receives information from the SAM. Alter the step 218, processing proceeds to a test step 220 wherein the client application determines whether the information from the indicates authenticated communication may proceed with the ICC.

If at the test step 220 it is determined that communication may not proceed, e.g., the information from the SAM indicates an authorization error, then processing proceeds to a step 222 where access denial processing is performed. If, at the test step 220, the information indicates that authenticated communication may proceed, for example, by including an identifier of the ICC ($ICC_{cred}$, such as a GUID), then processing proceeds to a step 224 where the client application coordinates the exchange of secure message information between the SAM and the ICC by coordinating the exchange of session-key protected commands. The client application may use the SAM to session protect the message (e.g., APDU wrapped) that are exchanged with the ICC. After the step 224, processing proceeds to a test step 226 where it is determined whether protected communication is to continue. If communication is to continue, then processing proceeds back to the step 224. If, at the test step 226, it is determined that processing is not to continue, then processing proceeds to a step 228 where the client application performs processing in connection with closing the communication channel with the ICC. After the step 228, processing is complete.

If, at the test step 206, it is determined that persistent binding processing is to occur, then processing proceeds to a step 240 where the client application challenges the ICC to authenticate by sending an authentication request to the ICC that may include the host certificate ($C_H$), the host ephemeral public key ($Q_{eH}$) and information ($CB_H$) that may indicate persistent binding processing. After the step 240, processing proceeds to a step 242 where the client application waits to receive a response from the ICC. After the step 242, processing proceeds to a step 244 where the client application receives a response from the ICC. As with the steps 208, 212 discussed above, the authentication challenge to the ICC may be unencrypted and the response from the ICC may be encrypted using the host ephemeral public key.

After the step 244, processing proceeds to a test step 246 where the client application determines whether persistent binding processing is to be used for the ICC. If not, then processing proceeds to the step 208, discussed above. If, at the test step 246, it is determined that persistent binding processing is to be used, then processing proceeds to a step 248 where the client application sends the ICC response and persistent binding information to the SAM to authenticate the ICC. In various embodiments, as further discussed elsewhere herein, in connection with persistent binding, and depending on the number of records involved, the information sent to the SAM may include the $OTID_{ICC}$ along with a flag or bit for the SAM to search a persistent binding table (fewer records) and/or the client application may sent persistent binding address information that may be used by the SAM to search a persistent binding table instead of searching the $OTID_{ICC}$. After the step 248, processing proceeds to the step 216.

Figure 12A:
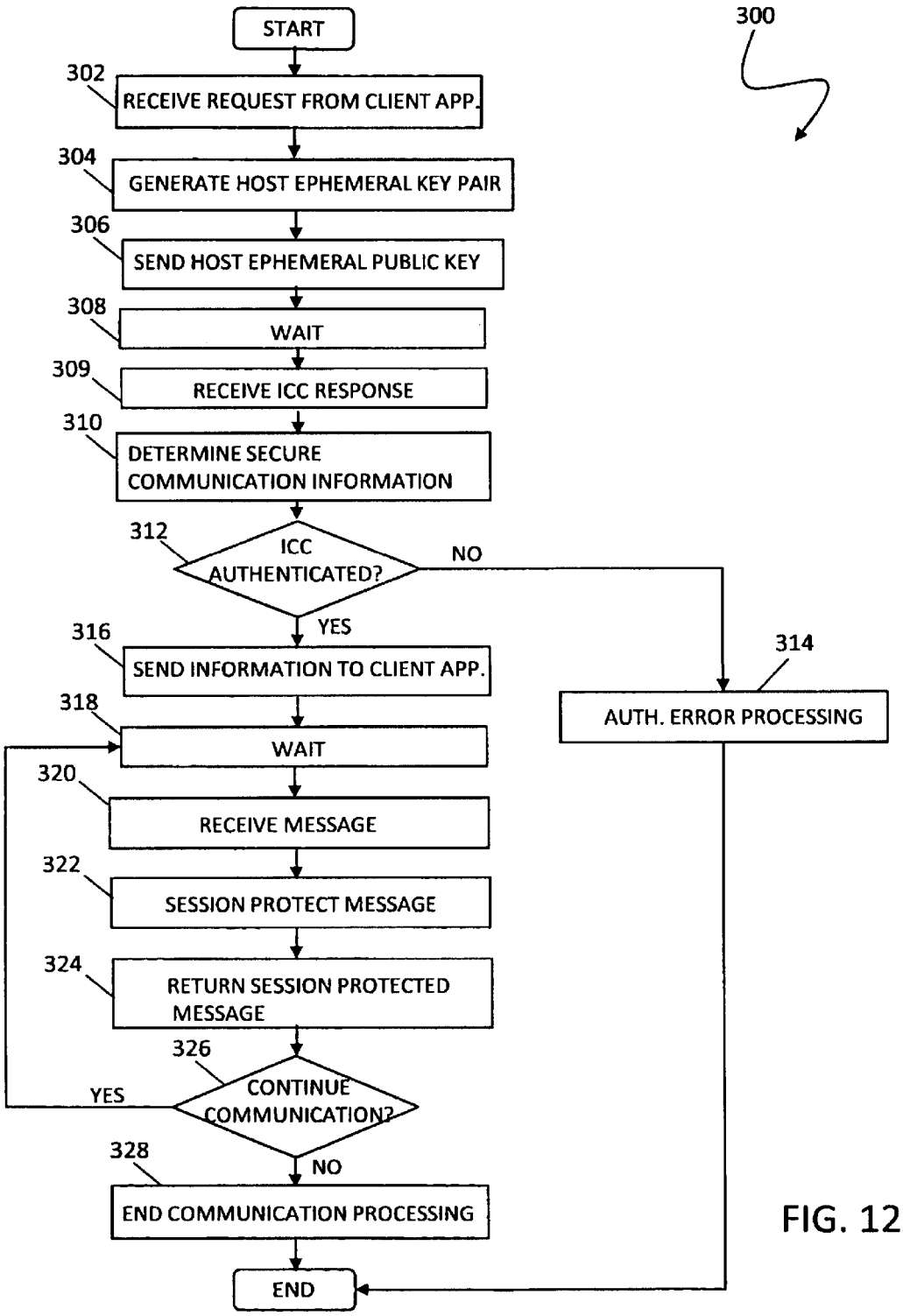
FIG. 12A is a flow diagram showing processing of the SAM under the OPACITY protocol for OPACITY-FS mode according to an embodiment of the system described herein.

FIG. 12A is a flow diagram 300 showing processing of the SAM under the OPACITY protocol for OPACITY-FS mode according to an embodiment of the system described herein. At a step 302, the SAM receives a request from the client application to generate the ephemeral key pair ($d_{eH}$, $Q_{eH}$). After the step 302, processing proceeds to a step 304 where the SAM generates the ephemeral key pair ($d_{eH}$, $Q_{eH}$). After the step 304, processing proceeds to a step 306 where the SAM sends the ephemeral public key ($Q_{eH}$) to the client application. After the step 306, processing proceeds to a waiting step 308 where the SAM waits to receive the ICC response, forwarded from the client application, to be authenticated. After the step 308, processing proceeds to a step 309 where the SAM receives the ICC response, forwarded from the client application, to be authenticated and that may include the one-time, anonymous ICC identifier ($OTID_{ICC}$) and/or other information, for example, that may be used in connection with persistent binding, as further discussed elsewhere herein. After the step 309, processing proceeds to a step 310 where the SAM, in connection with authenticating the ICC using the ICC response, determines session keys and other information for secure communication with the ICC. The step 310 may include determining the identifier of the ICC ($ICC_{cred}$, e.g., the GUID), as further discussed elsewhere herein.

After the step 310, processing proceeds to a test step 312 where the SAM determines whether the ICC is authenticated. The SAM may authenticate the ICC by verifying that it also possesses one or more session keys as determined by the SAM in step 310, for example, by applying an encryption-based message authentication code (MAC) algorithm, such as an AES128 algorithm according to the NIST SP 800-38 B standards, to cryptogram information received from the ICC in the ICC response. If, at the test step 312, it is determined that the ICC is not authenticated, then processing proceeds to a step 314 where error processing occurs that may include sending an authorization, error message to the client application. If, at the test step 312, it is determined that the ICC is authenticated, then processing proceeds to a step 316 where the SAM sends the identifier of the ICC and/or other appropriate information to the client application indicating authentication of the ICC.

After the step 316, processing proceeds to a step 318 where the SAM waits to receive messages from the client application that are to be session key protected (e.g., APDU wrapped). After the step 318, processing proceeds to a step 320 where the SAM receives a message from the client application that is to be protected. After the step 320, processing proceeds to a step 322 where the SAM session key-protects the message. After the step 322, processing proceeds to a step 324 where the SAM returns the protected message to the client application. After the step 324, processing proceeds to a test step 326 where it is determined whether communication is to continue. If communication is to continue, then processing proceeds back to the step 318. If, at the test step 326, it is determined that communication is not to continue, then processing proceeds to a step 328 where end communication processing is performed. After the step 328, processing is complete.

Figure 12B:
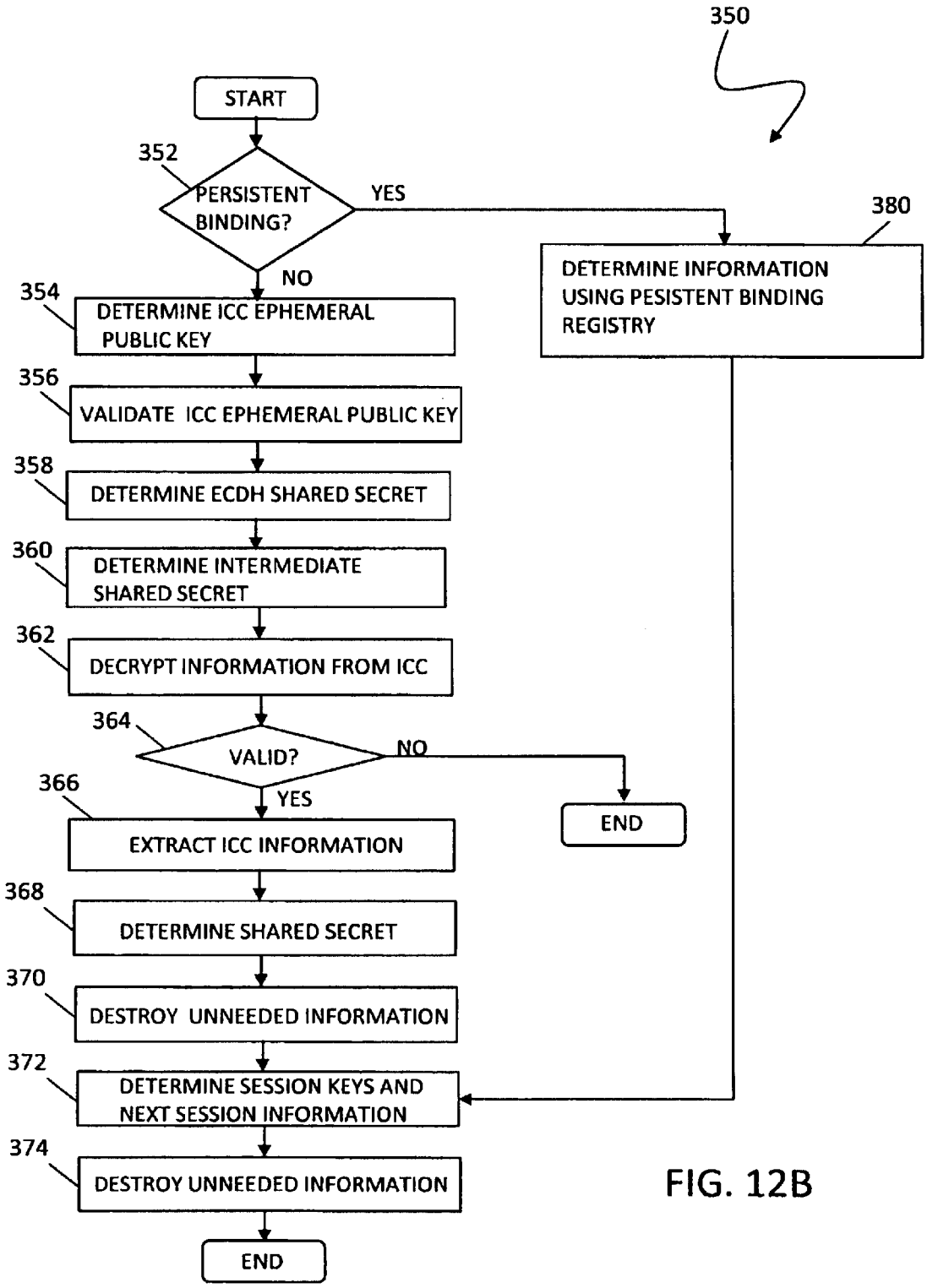
FIG. 12B is a flow diagram showing more detailed processing of the SAM according to an embodiment of the system described herein.

FIG. 12B is a flow diagram 350 showing processing of the SAM at the step 310 in FIG. 12A in more detail according to an embodiment of the system described herein. At a test step 352, the SAM determines whether persistent binding processing is to be used. If persistent binding is to be used, processing proceeds to a step 380. If persistent binding processing is not to proceed, then processing proceeds to a step 354 where the SAM determines an ephemeral public key of the ICC ($Q_{eICC}$) using the one-time, anonymous ICC identifier ($OTID_{ICC}$), for example by determining $Q_{eICC}$= $OTID_{ICC}$. After the step 354, processing proceeds to a step 356 where $Q_{eICC}$ is validated as corresponding to elliptical domain parameters (i.e., belonging to the EC domain). After the step 356, processing proceeds to a step 358 where the SAM computes an ECDH shared secret (Z1=EC_DH($d_{sH}$, $Q_{eICC}$). After the step 358, processing proceeds to a step 360 where the SAM determines an intermediate shared secret (K1) using a key derivation function (KDF), the ECDH shared secret (Z1), the host identifier ($ID_{dH}$) and ICC ephemeral public key ($Q_{eICC}$), among other appropriate information (such as length information of the key, according to the required standard). After the step 360, processing proceeds to a step 362 where the SAM decrypts information received from the ICC using the intermediate shared secret (K1) to obtain the ICC CVC ($C_{ICC}$). After the step 362 processing proceeds to a test step 364 where it is determined whether the $C_{ICC}$ is valid. If not valid, then processing is complete. If at the test step 364, it is determined that the $C_{ICC}$ is valid, then processing proceeds to a step 366 where the ICC certificate identifier ($ICC_{cred}$) and the ICC static certificate root public key ($Q_{sICC}$) are extracted.

After the step 366, processing proceeds to a step 368 where the shared secret (Z) is determined, for example by a concatenation process of Z1 and EC_DH($d_{eH}$, $Q_{sICC}$) according to NIST SP 800-56A. After the step 368, processing proceeds to a step 370 where information no longer needed, such as Z1 and K1, are destroyed. After the step 370, processing proceeds to a step 372 where the session keys are determined as well as a shared secret and a one-time identifier for the next session based on applying the key derivation function (KDF) using Z, $ID_{sH}$, $OTID_{ICC}$, $Q_{eH}$ among other appropriate information (such as an ICC nonce $N_{ICC}$, if applicable). It is also noted that if persistent binding is being used, the information for the next session may be registered in the persistent binding table of the SAM. After the step 372, processing proceeds to a step 374 where Z, $d_{eH}$ and $Q_{eH}$ and/or other unneeded information may be destroyed. It may also be noted that other steps consistent with appropriate cryptographic standards, for example NIST SP 800-56A, may be taken, including the destroying of information. After the step 374, processing is complete.

If, at the test step 352, it is determined that persistent binding processing is to proceed, then at a step 380 the SAM determines the shared secret (Z) and $ICC_{cred}$ and/or other appropriate information using the persistent binding registry. After the step 380, processing proceeds to the step 372, discussed above.

Figure 13A:
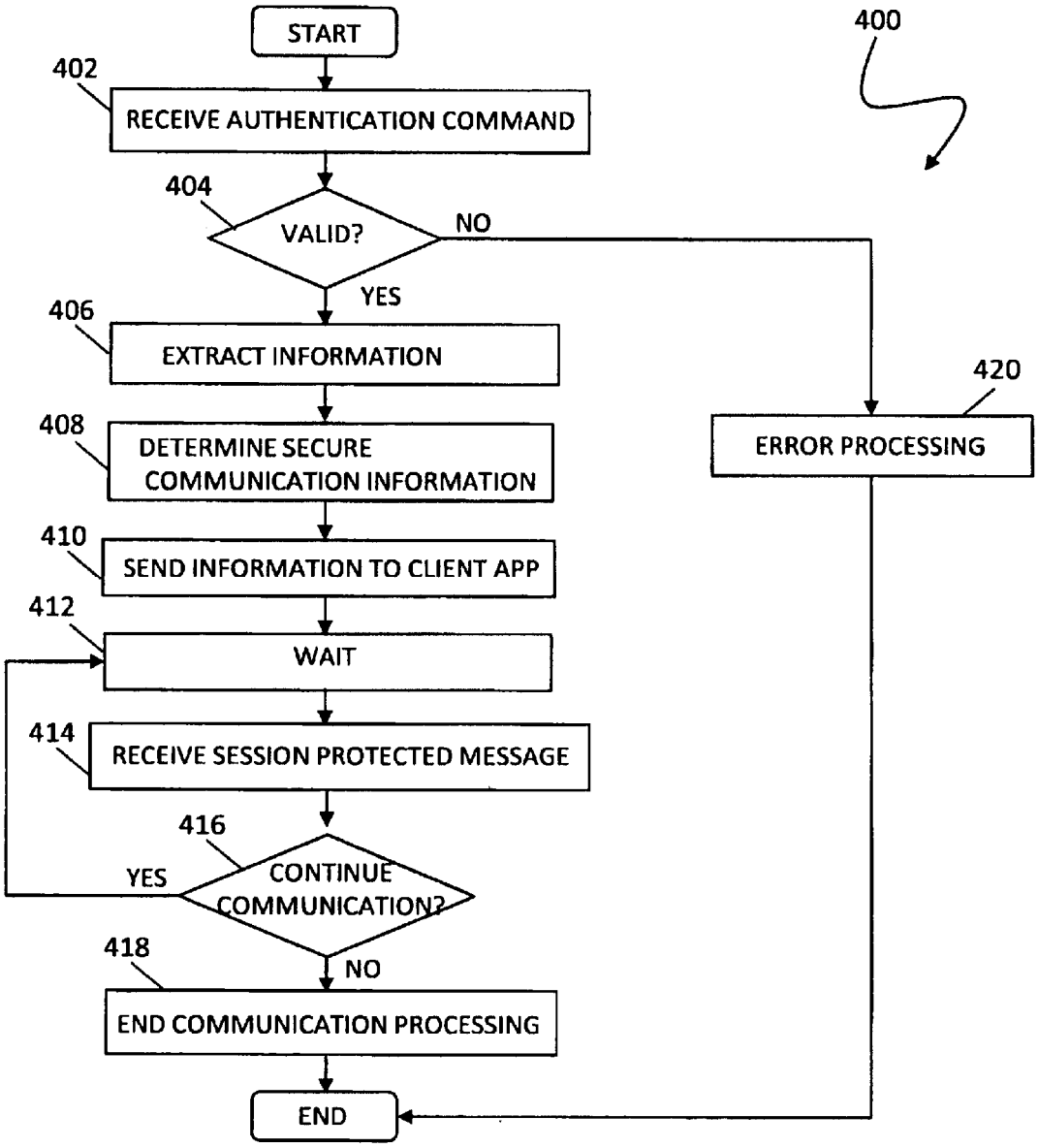
FIG. 13A is a flow diagram showing processing of the ICC under the OPACITY protocol for OPACITY-FS mode according to an embodiment of the system described herein.

FIG. 13A is a flow diagram 400 showing processing of the ICC under the OPACITY protocol for OPACITY-FS mode according to an embodiment of the system described herein. At a step 402, the ICC receives a command to authenticate itself from the client application that may include information of the SAM's CVC ($C_H$) and the generated ephemeral public key ($Q_{eH}$). After the step 402, processing proceeds to a test step 404 where the ICC determines whether the information of the SAM's CVC ($C_H$) received from the client application is valid using a root public key ($Q_{rootH}$) and/or the ICC may also verify whether the $Q_{eH}$ belongs to the EC domain (e.g., verify EC parameters per NIST SP 800-56A). If the SAM's CVC ($C_H$) is determined to not be valid (or is otherwise not verified), then processing proceeds to a step 420 where error processing is performed. If, at the test step 404, the SAM's CVC ($C_H$) is determined to be valid, then processing proceeds to a step 406 where the ICC extracts information from the SAM's CVC ($C_H$) that may include the terminal or host identifier ($ID_{sH}$) and the host's static certificate public key ($Q_{sH}$).

After the step 406, processing proceeds to a step 408 where the ICC determines secure communication information including the one-time anonymous identifier of the ICC ($OTID_{ICC}$), sessions keys and other information for communicating with the SAM via the client application and/or other encrypted information, as further discussed elsewhere herein. After the step 408, processing proceeds to a step 410 where the ICC sends the one-time identifier ($OTIC_{ICC}$) and other encrypted information to the client application. After the step 410, processing proceeds to a step 412 where the ICC waits to receive session protected commands from the client application. After the step 412, processing proceeds to a step 414 where the ICC receives and executes a session key-protected message. After the step 414 processing proceeds to a test step 416 where is determined whether communication is to continue. If communication is to continue, then processing proceeds back to the step 412. If, at the test step 416, it is determined that communication is not to continue, then processing proceeds to a step 418 where communication end processing is performed. After the step 418, processing is complete.

Figure 13B:
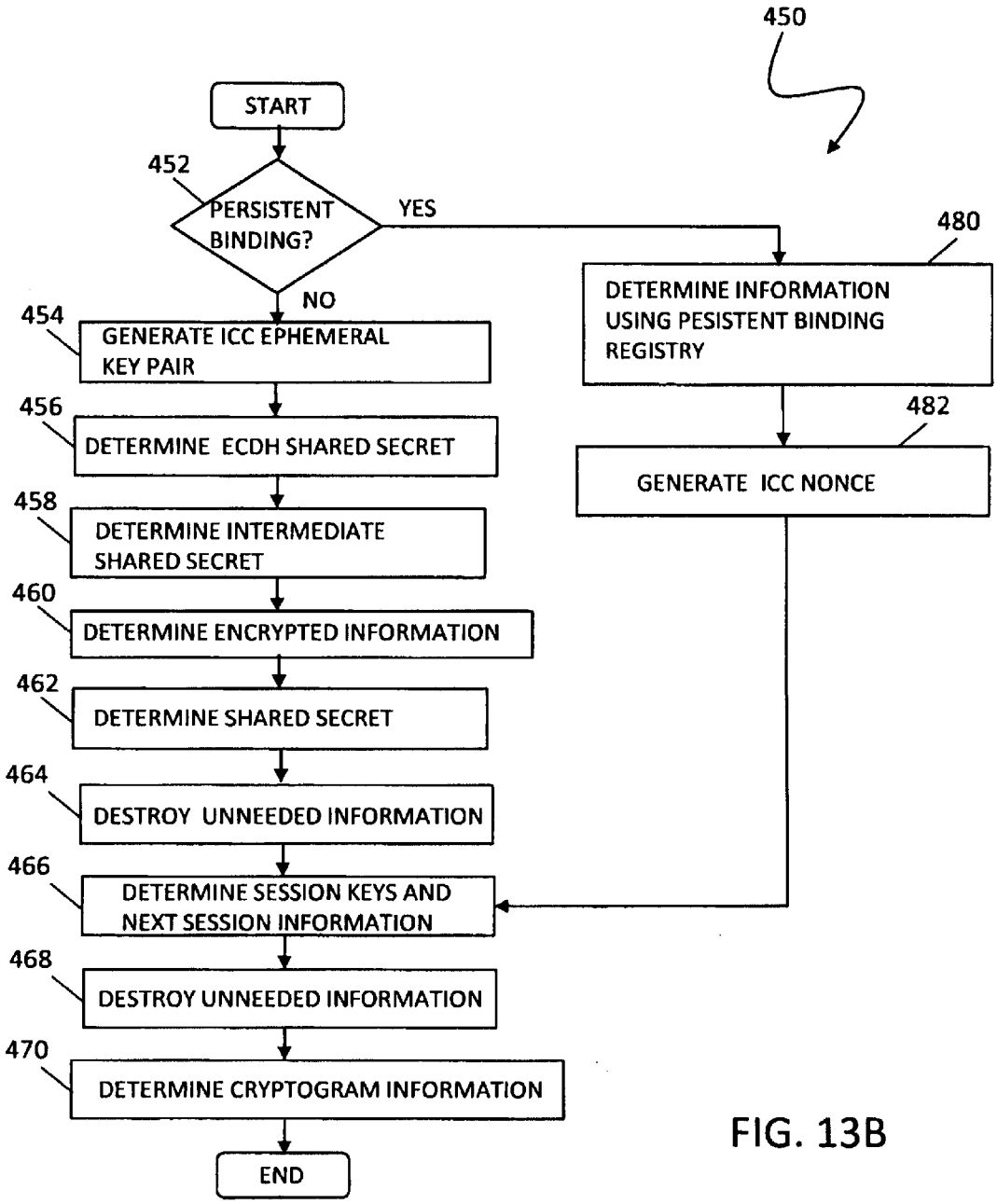
FIG. 13B is a flow diagram showing more detailed processing of the ICC according to an embodiment of the system described herein.

FIG. 13B is a flow diagram 450 showing processing of the ICC at the step 408 in FIG. 13A according to an embodiment of the system described herein. At a test step 452, the ICC determines whether persistent binding processing is to be used that may include the ICC scanning for the host identifier ($ID_{sH}$) in the persistent binding table/registry. If at the test step 452, it is determined that persistent binding processing is not to be used, for example, there is no persistent binding registry and/or the host identifier is not found in the registry, then processing proceeds to a step 454 where the ICC generates an ephemeral (e.g., ECC) key pair ($d_{eICC}$, $Q_{eICC}$). After the step 454, processing proceeds to a step 456 where the ICC determines the ECDH shared secret (Z1=EC_DH($d_{eICC}$, $Q_{sH}$)). After the step 456, processing proceeds to a step 458 where the ICC determines the intermediate shared secret (K1) using the key derivation function (KDF) and the ECDH shared secret (Z1). After the step 458, processing proceeds to a step 460 where the ICC computes encrypted information by encrypting the intermediate shared secret (K1) and the ICC CVC ($C_{ICC}$) and sets the ephemeral public key ($Q_{eICC}$) as the one-time used identifier ($OTID_{ICC}$).

After the step 460, processing proceeds to a step 462 where the shared secret (Z) is determined by a concatenation process on Z1 and EC_DH($d_{sICC}$, $Q_{eH}$), for example according to NIST SP 800-56A. After the step 462, processing proceeds to a step 464 where Z1 and K1 are destroyed. After the step 464, processing proceeds to a step 466 where the session keys are computed as well as a shared secret and a one-time identifier for the next session based on applying the key derivation function (KDF) using Z, $ID_{sH}$, $OTID_{ICC}$, $Q_{eH}$ among other appropriate information (such as an ICC nonce $N_{ICC}$, if applicable).

If, at the step 452, the host identifier is found in the persistent binding registry, then processing proceeds to a step 480 to use the registry to recover the previously stored shared secret. At the step 480, using $ID_{sH}$ as an index, the ICC obtains Z and $OTIC_{ICC}$ from the registry. After the step 480, processing proceeds to a step 482 where the ICC generates a secret nonce ($N_{ICC}$) that will be used in the computation of the session keys and information for the next session. After the step 482, processing proceeds to the step 466 discussed above.

After the step 466, processing proceeds to a step 468 where Z, $d_{eICC}$ and $Q_{eICC}$ are destroyed. After the step 468, processing proceeds to a step 470 where the ICC determines a return cryptogram allowing ICC authentication and showing to the client application that the ICC owns the required one or more session keys. The ICC may determine the cryptogram by applying an encryption-based message authentication code (MAC) algorithm, such as an AES128 based on algorithm according to the NIST SP 800-38B standards, to appropriate information, such as one of the session keys, $OTID_{ICC}$, $ID_{sH}$ and $Q_{eH}$, among other information. It may also be noted that other steps consistent with appropriate cryptographic standards, for example NIST SP 800-56A, may be taken, including destroying one or more of the session keys. Furthermore, it is also noted that the ICC may store information in order to facilitate future communications with the host, including storing the host identifier and other information in the ICC's persistent binding registry, if applicable. After the step 470 processing is complete.

In connection with OPACITY-ZKM, processing may be similar to that described herein with respect to OPACITY-FS except for authentication and processing requirements concerning the SAM that may be not supported. Accordingly, under the OPACITY-ZKM mode, static terminal keys (except for the root public key) are not required and the mode provides for card authentication but not terminal authentication. OPACITY-ZKM is therefore suitable in environments where terminals are known and trusted. The basic ZKM authentication protocol is an ICC internal authentication protocol and key agreement using EC cryptography. The initiator generates an ephemeral key pair but has no static key pair; the responder has only a static key pair. For appropriate processing standards and operations consistent for use with OPACITY-ZKM, reference is made to ISO 24727-3, the section entitled "EC Key Agreement with ICC Authentication, Appendix A-1".

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for authenticating a device, comprising:

generating authentication information at a host;

sending a request to authenticate the device, wherein the request includes at least a portion of the authentication information;

receiving a response to the request at the host, wherein the response includes encrypted information and an anonymous identifier of the device that does not provide readable identification information to an entity other than the host; and authenticating the device using the encrypted information and the anonymous identifier.

2. The method of claim 1, wherein the method includes receiving only one response with the encrypted information and the anonymous identifier.

3. The method of claim 1, wherein at least one of: the anonymous identifier and the encrypted information is a one-time use identifier of the device.

4. The method of claim 1, wherein the request sent from the host to the device is unencrypted.

5. The method of claim 1, wherein a portion of the encrypted information in the response is encrypted using a portion of the authentication information.

6. The method of claim 1, wherein the encrypted information sent from the device to the host is decipherable by only the host.

7. The method of claim 1, wherein each of the host and the device uses a shared secret and wherein the shared secret is one of: established by the device before sending back a response to the request at the host and established in advance before sending authentication information from the host.

8. The method of claim 7, wherein a portion of the encrypted information in the response is encrypted using a key derived from the shared secret.

9. The method of claim 1, further comprising:

retrieving stored information corresponding to the authenticating of the device that is stored on at least one of: the device and the host.

10. The method of claim 1, further comprising:

deactivating the host, wherein reactivation of the host is performed using an administrator device.

11. The method of claim 1, wherein the device includes at least one of: a smart card and a mobile phone having a secure element.

12. The method of claim 1, wherein the host is an access point of an access controlled system and, upon presentation of the device at the access point, the access point authenticates the device and establishes a shared secret with the device to obtain an access credential, and wherein the access point relies on the access control system to validate the access credential for authorization and granting access.

13. A non-transitory computer readable medium storing computer software for authenticating a device, the computer software comprising:

executable code that generates authentication information at a host;

executable code that sends a request to authenticate the device, wherein the request includes at least a portion of the authentication information;

executable code that receives a response to the request from the device, wherein the response includes encrypted information and an anonymous identifier of the device that does not provide readable identification information to an entity other than the host; and executable code that authenticates the device using the encrypted information and the anonymous identifier.

14. The non-transitory computer readable medium of claim 13, wherein at least one of: the anonymous identifier and the encrypted information is a one-time use identifier of the device.

15. The non-transitory computer readable medium of claim 13, wherein the request sent from the host to the device is unencrypted.

16. The non-transitory computer readable medium of claim 13, wherein a portion of the encrypted information in the response is encrypted using a portion of the authentication information.

17. The non-transitory computer readable medium of claim 13, wherein each of the host and the device uses a shared secret, and wherein the shared secret is one of: established by the device before sending a response to the request at the host and established in advance before sending authentication information from the host.

18. The non-transitory computer readable medium of claim 17, wherein a portion of the encrypted information in the response is encrypted using a key derived from the shared secret.

19. The non-transitory computer readable medium of claim 13, wherein the computer software further comprises:

executable code that deciphers the encrypted information and processes the anonymous identifier.

20. The non-transitory computer readable medium of claim 13, wherein the computer software further comprises:

executable code that retrieves stored information corresponding to the authenticating of the device that is stored on the host.

21. The non-transitory computer readable medium of claim 13, wherein the host is an access point of an access controlled system and, upon presentation of the device at the access point, the access point authenticates the device and establishes a shared secret with the device to obtain an access credential, and wherein the access point relies on the access control system to validate the access credential for authorization and granting access.

22. A method for authenticating a device, comprising:

receiving, at the device, a request to authenticate the device;

generating a response to the request; and sending the response to a host, wherein the response includes encrypted information and an anonymous identifier of the device that does not provide readable identification information to an entity other than the host and wherein the response authenticates the device to the host.

23. The method of claim 22, wherein at least one of: the anonymous identifier and the encrypted information is a one-time use identifier of the device.

24. The method of claim 22, wherein the device generates the encrypted information using at least one of: information provided in the request and a key derived from a shared secret of the device and the host.

25. The method of claim 22, further comprising:

authenticating the host at the device.

26. The method of claim 25, further comprising:

retrieving stored information corresponding to the authenticating of the host that is stored on the device.

27. The method of claim 22, wherein the host is an access point of an access controlled system, and wherein the device requests access to an access controlled terminal.

28. A non-transitory computer readable medium storing computer software for authenticating a device, the computer software comprising:

executable code that receives a request to authenticate the device;

pexecutable code that generates a response to the request; and executable code that sends the response to a host, wherein the response includes encrypted information and an anonymous identifier of the device that does not provide readable identification information to an entity other than the host and wherein the response authenticates the device to the host.

29. The non-transitory computer readable medium of claim 28, wherein at least one of: the anonymous identifier and the encrypted information is a one-time use identifier of the device.

30. The non-transitory computer readable medium of claim 28, wherein the encrypted information is generated using at least one of: information provided in the request and a key derived from a shared secret of the device and the host.

31. The non-transitory computer readable medium of claim 28, wherein the computer software further comprises:

executable code that authenticates the host to the device.

32. The non-transitory computer readable medium of claim 31, further comprising:

executable code that retrieves stored information corresponding to the authenticating of the host that is stored on the device.

33. The non-transitory computer readable medium of claim 28, wherein the host is an access point of an access controlled system and, upon presentation of the device at the access point, the access point authenticates the device and establishes a shared secret with the device to obtain an access credential, and wherein the access point relies on the access control system to validate the access credential for authorization and granting access.

34. A system for authenticating a device, comprising:

a host; and a device that authenticates to the host, wherein the host includes a non-transitory computer readable medium that includes: executable code that generates authentication information at the host; executable code that sends a request to authenticate the device, wherein the request includes at least a portion of the authentication information; executable code that receives a response to the request from the device, wherein the response includes encrypted information and an anonymous identifier of the device that does not provide readable identification information to an entity other than the host; and executable code that authenticates the device using the encrypted information and the anonymous identifier, and wherein the device includes a non-transitory computer readable that includes: executable code that receives the request; executable code that generates the response; and executable code that sends the response to the host, wherein the response authenticates the device to the host.

35. The system of claim 34, wherein the host includes a client application and a secure access module.

36. The system of claim 34, wherein the device includes at least one of: a smart card and a mobile phone including a secure element.

37. The system of claim 34, wherein the request sent from the host to the device is unencrypted, and wherein a portion of the encrypted information in the response is encrypted using the portion of the authentication information.

38. The system of claim 34, wherein each of the host and the device uses a shared secret and wherein the shared secret is one of: established by the device before sending a response to the request at the host and established in advance before sending authentication information from the host.

39. The system of claim 38, wherein a portion of the encrypted information in the response is encrypted using a key derived from the shared secret.

40. The system of claim 37, wherein the host is an access point of an access controlled system and, upon presentation of the device at the access point, the access point authenticates the device and establishes a shared secret with the device to obtain an access credential and wherein the access point relies on the access control system to validate the access credential for authorization and granting access.

* * * * *